United States Patent

Sunagawa

[11] Patent Number: 5,081,615
[45] Date of Patent: Jan. 14, 1992

[54] METHOD OF COUPLING EXTERNAL LIGHT INTO AN OPTICAL WAVEGUIDE AND A GUIDED WAVE FROM AN OPTICAL WAVEGUIDE AND OPTICAL PICKUP EMPLOYING AN OPTICAL WAVEGUIDE

[75] Inventor: Hiroshi Sunagawa, Kanagawa, Japan
[73] Assignee: Fuji Photo Film Co., Ltd., Kanagawa, Japan
[21] Appl. No.: 451,677
[22] Filed: Dec. 18, 1989

[30] Foreign Application Priority Data

Dec. 16, 1988 [JP] Japan .............................. 63-317759
Dec. 16, 1988 [JP] Japan .............................. 63-317760
Feb. 15, 1989 [JP] Japan .............................. 1-35568

[51] Int. Cl.$^5$ .............................................. G11B 7/00
[52] U.S. Cl. ................................. 369/44.12; 369/112; 350/96.13; 350/96.11; 385/37
[58] Field of Search ............... 369/44.12, 44.37, 44.38, 369/109, 112; 350/96.11, 96.14, 162.11, 96.12, 96.13, 96.15, 96.16; 360/114

[56] References Cited

U.S. PATENT DOCUMENTS

4,833,561 5/1989 Sunagawa et al. ............... 369/44.12
4,885,732 12/1989 Sunagawa et al. ............... 369/44.12
4,971,414 11/1990 Funato et al. ........................ 369/112

FOREIGN PATENT DOCUMENTS

63-61430 3/1988 Japan .

Primary Examiner—Roy N. Envall, Jr.
Assistant Examiner—Hung Dang
Attorney, Agent, or Firm—Sughrue, Mion, Zinn, Macpeak & Seas

[57] ABSTRACT

A guided wave is coupled from an optical waveguide through a grating coupler, or an external light beam is coupled into an optical waveguide through a grating coupler. The grating coupler is disposed on a surface of the optical waveguide. The external light beam is diffracted by a wavelength-fluctuation-correcting grating in a direction opposite to the direction of diffraction by the grating coupler on the surface of the optical waveguide, while satisfying the Bragg condition or a predetermined equation. Alternatively, the external light beam is passed through an end surface of the substrate of the optical waveguide so that the light is refracted in the same direction as the direction of diffraction by the grating coupler on the surface of the optical waveguide, the end surface being inclined with respect to the optical waveguide at a certain angle. Optical pickups employing an optical waveguide are also disclosed.

5 Claims, 10 Drawing Sheets

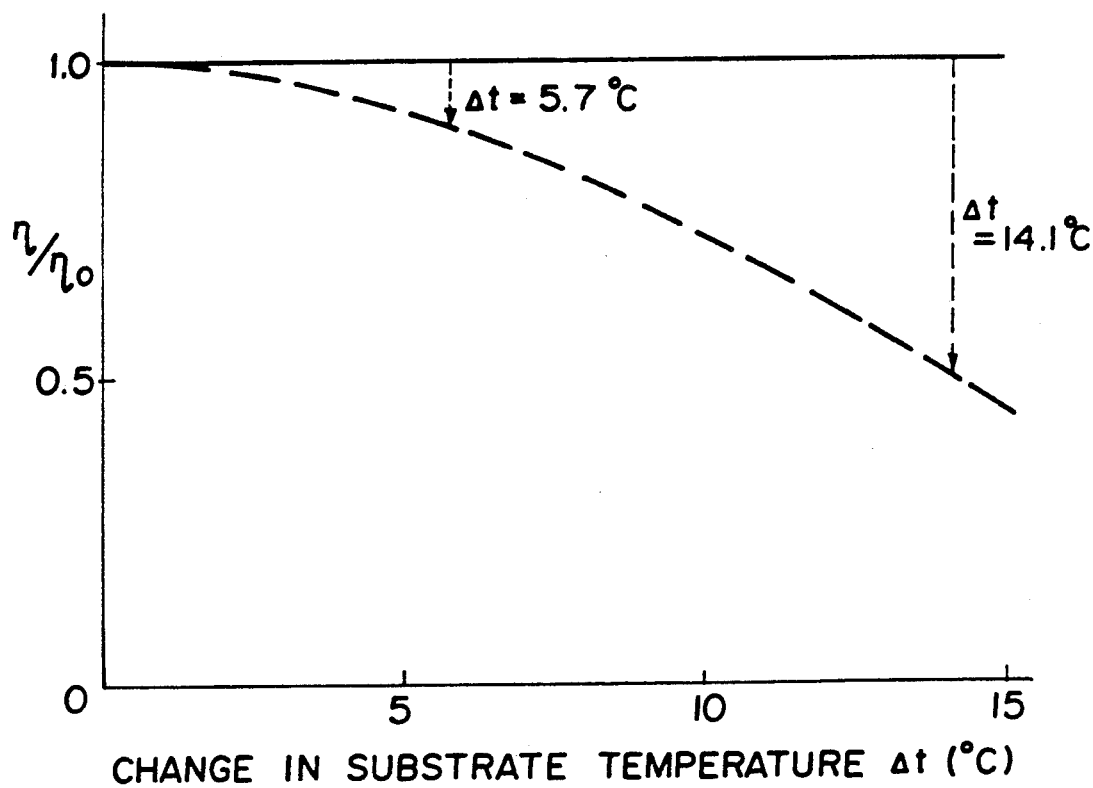
F I G. 18

METHOD OF COUPLING EXTERNAL LIGHT INTO AN OPTICAL WAVEGUIDE AND A GUIDED WAVE FROM AN OPTICAL WAVEGUIDE AND OPTICAL PICKUP EMPLOYING AN OPTICAL WAVEGUIDE

BACKGROUND OF THE INVENTION

1. Field of the Invention

The present invention relates to a method of coupling a guided wave from an optical waveguide through a grating coupler or coupling external light into an optical waveguide through a grating coupler. The present invention also relates to an optical pickup for reading signals recorded on optical recording mediums such as optical discs or on magnetooptic recording mediums, and more particularly to an optical pickup employing an optical waveguide.

2. Description of the Prior Art

Some conventional optical waveguides include grating couplers mounted on the surface of the waveguide. The grating couplers serve to introduce an external light beam into the optical waveguide and extract a guided wave from the optical waveguide, i.e., to couple an external light beam with the optical waveguide or a guided wave which is propagating in the optical waveguide to an external device. A grating coupler is more advantageous than other light input and output coupling devices such as prism couplers since grating couplers contribute to smaller and lighter optical waveguides.

However, the grating couplers are problematic in that when they are used to couple external light into optical waveguides, the efficiency with which the external light is introduced into the optical waveguides (hereinafter referred to as the "light input efficiency") greatly varies depending on changes in the wavelength of the external light, and when they are used to couple guided waves from optical waveguides to other devices, the angle at which the output light leaves the optical waveguides (hereinafter referred to as the "light exit angle") varies greatly depending on changes in the wavelength of the light.

In most waveguides, a laser beam emitted from a semiconductor laser is what is guided. Since a semiconductor laser beam is susceptible to wavelength fluctuations as is well known in the art, it is necessary to employ a temperature regulating device such as a Peltier-effect device, which is relatively expensive, to regulate the temperature of the semiconductor laser in order to suppress variations in the wavelength of the laser beam emitted by the semiconductor laser. However, if the laser beam of a semiconductor laser is directly modulated, then it is highly difficult to reduce wavelength fluctuations sufficiently even if such a temperature regulating device is used.

FIG. 15 of the accompanying drawings illustrates the manner in which the light input efficiency $\Delta$ varies depending on the change $\lambda\eta$ in the light wavelength. It is assumed that the wavelength (i.e., the central wavelength which is used as the reference wavelength when a grating coupler is designed) of the external light to be applied to an optical wavelength is $\lambda = 788$ nm, the effective refractive index of the optical waveguide is $N = 2.187$, the refractive index of the substrate of the optical waveguide is $N_s = 2.182$, the period of the grating coupler is $\Lambda = 3.00$ μm, the angle at which the external light is applied to the grating coupler is $\Phi = 61.87°$, and the length along which the external light is coupled through the grating coupler to the optical waveguide (hereinafter referred to as the "coupling length") is b. The variation of the light input efficiency is expressed by $\eta/\eta_o$ where $\eta_o$ is the maximum light input efficiency. As can be understood from FIG. 15, even if the coupling length b is small enough for intensive light coupling, the light input efficiency $\eta$ will be reduced to about ½ of the maximum light input efficiency $\eta_0$ when the light wavelength varies by about 2 nm, for example.

In cases where a guided wave is extracted from an optical waveguide through a grating coupler on the surface thereof, if the period of the grating coupler is $\Lambda = 3.78$ μm and the light exit angle is 65°, then the light exit angle varies by about $0.63 \times 10^{-3}$ per light wavelength change $\Delta\lambda = 1$ nm.

In addition, the grating couplers are also disadvantageous in that the light input efficiency thereof, when used to couple external light into optical waveguides, and the light exit angle thereof, when used to couple guided waves from optical waveguides to external devices, are highly sensitive to changes in the ambient temperature. Such high sensitivity to temperature variations will be described below with reference to a grating coupler which is used to couple external light to an optical waveguide.

When external light is applied through an optical waveguide substrate to a grating coupler, the phase matching condition, i.e., a condition which must be met for phase matching to be achieved between the external light and a guided wave in the optical waveguide, is given by:

$$n\,k\,\sin\Phi = Nk - mK \qquad (1)$$

where $\Phi$ is the angle of incidence of the external light upon the grating coupler, N is the effective refractive index of the optical waveguide, m is the coupling order number of the grating coupler, and k and K are parameters defined as follows:

$$k = ||k|| = 2\pi/\lambda$$

$$K = ||K|| = 2\pi/\Lambda$$

where $|k$ and $|K$ are the wave vectors of the light and the grating coupler, respectively, $\lambda$ is the wavelength of the light, and $\Lambda$ is the period of the grating coupler. When the external light is applied to the grating coupler through the substrate as described above, it is normally introduced through an obliquely cut end surface of the substrate. In most cases, the angle of incidence of the external light upon the end surface of the substrate is set at 0°, i.e., the external light is applied perpendicularly to the end surface of the substrate, in order to facilitate the design of an antireflection coating on the end surface.

Generally, the refractive index n of a substrate material has a high temperature coefficient. For example, the temperature coefficient of the refractive index $\Delta n/\Delta t$ of $LiNbO_3$ is $5.3 \times 10^{-5z}$ deg$^{-1}$. Since the effective refractive index N of an optical waveguide varies depending on the change in the refractive index of the substrate thereof, phase matching is gradually degraded and the light input efficiency decreases as the temperature changes when the incident angle $\Phi$ remains constant, as is apparent from equation (1) above.

When external light is introduced through the end surface of the substrate, if it were not applied perpendicularly to the end surface, the light exit angle from the end surface would vary depending on the change in the temperature, i.e., the refractive index, of the substrate, and the angle of incidence Φ of the external light upon the grating coupler would vary. The phase matching condition cannot be satisfied at all times at each temperature if only the incident angle Φ varies.

When external light is applied to the grating coupler through a surrounding medium (normally air) opposite to the substrate of the optical waveguide, the phase matching condition is given by equation (1) except that the refractive index n of the substrate of the optical waveguide is replaced with the refractive index of the surrounding medium. With this arrangement, too, the effective refractive index N of the optical waveguide varies depending on the temperature change of the substrate, and since the angle Φ of incidence of the external light upon the grating coupler remains constant, the same problems mentioned above occur.

As described above, the light input efficiency varies depending on the temperature change of the substrate when a grating coupler is used to couple the external light to the optical waveguide. It is clear from the reciprocity theorem about input light and output light that the light exit angle varies depending on the temperature change of the substrate when the guided wave is extracted from the grating coupler.

Optical recording mediums such as optical discs have recently been widely used for recording image signals and audio signals. Signals are recorded on optical recording mediums in the form of pits or as different reflectivities, and can be read by an optical pickup. Hereinafter, it is assumed that signals are recorded as pits in an optical recording medium. The optical pickup applies a light beam such as a laser beam, for example, to the recording surface of the optical recording medium, and detects the intensity level of the light reflected from the optical recording medium to determine whether there is a pit or not at the spot where the light beam is applied.

In addition to the reading of the recorded information, the optical pickup also detects tracking errors and determines whether a light beam used to detect pits has been displaced laterally from the center of a series of pits (track). The optical pickup also detects focusing errors and determines whether a light beam is focused properly, i.e., whether it is overfocused or underfocused, with respect to the recording surface of the optical recording medium. Tracking and focusing error signals are used by tracking and focusing feedback control loops to align the light beam with the track and also to focus the light beam properly on the recording surface of the optical recording medium, until finally the tracking and focusing error signals are eliminated. Conventional tracking error measuring methods include a push-pull method, a heterodyne method, and a time-difference detecting method, and conventional focusing error detecting systems include an astigmatic method, a critical-angle detecting method, and a Foucault knife-edge method.

Magnetooptic recording mediums such as magnetooptic discs have also been widely used as mediums for recording image signals and audio signals. The direction of magnetization in the magnetooptic recording medium carries the information about the signals recorded on the medium, and the magnetization direction can be read by an optical pickup. The optical pickup applies a linearly polarized light beam such as a laser beam, for example, to the recording surface of the magnetooptic recording medium, and detects the direction of magnetization in the magnetooptic recording medium, based on the principle that the plane of polarization of light reflected from the recording medium will rotate depending on the direction of magnetization. (The phenomenon is known as the magnetooptic Kerr effect.)

More specifically, an optical pickup for use with a magnetooptic recording medium has a light detector for detecting light reflected from the recording medium through an analyzer. Since the intensity of the reflected light varies as its plane of polarization rotates, the optical pickup can detect the direction of magnetization, i.e., the information recorded on the recording surface of the magnetooptic recording medium. An optical pickup of this type also has tracking and focusing error detecting systems in addition to its ability to read recorded information.

Heretofore, conventional optical pickups have included a beam splitter for separating the light beam reflected by an optical or magnetooptic recording medium from the light beam being applied to the recording medium, a lens for focusing the reflected light beam onto a light detector comprising a photodiode or the like, and a prism for directing the reflected light beam toward the tracking and focusing error detecting systems. An optical pickup for use with a magnetooptic recording medium also includes microoptic devices such as an analyzer, as referred to above.

Microoptic devices require precise machining when they are produced, and it is tedious and time-consuming to adjust their positions with respect to each other when they are incorporated in an optical pickup. Therefore, optical pickups which include such microoptic devices are expensive to manufacture. Since these optical pickups are relatively large and heavy, information read-out units including them are limited as to how small and light they can be, and the speed with which desired information recorded on a recording medium can be accessed is also limited.

In view of the aforesaid drawbacks, there have been proposed optical pickups which are small and light and can be manufactured inexpensively because they employ optical waveguides.

One of the proposed optical pickups, which is used with an optical recording medium, includes a single optical waveguide device having convergent grating couplers. The optical waveguide device is capable of functioning as a beam splitter, a lens, and a prism, as described above.

More specifically, the optical pickup comprises a light source for applying a light beam to the recording surface of an optical recording medium such as an optical disc, an objective lens for focusing the light beam onto the recording surface of the optical recording medium, and an optical waveguide directed such that it receives, on one surface thereof, the light beam reflected from the recording surface of the optical recording medium.

The optical pickup also has first and second convergent grating couplers on the surface of the optical waveguide, to which surface the reflected light beam is applied, for introducing the reflected light beam into the optical waveguide. The first and second convergent grating couplers are disposed one on each side of an axis which passes substantially through the center of the reflected beam applied to the optical waveguide and also which extends across the surface of the optical waveguide in a direction which is perpendicular to a normal of a track of recorded signals. The first and second convergent grating couplers are arranged such that they converge the reflected light beams propagating in the optical waveguide toward positions spaced from each other across the axis.

The optical pickup further has first and second sets of light detectors which are disposed on the surface or an end face of the optical waveguide and detect the reflected light beams respectively converged by the first and second convergent grating couplers. Thereby the optical pickup reads recorded information and detects any tracking and focusing errors from the reflected light beams. For further details, reference should be made to Japanese Unexamined Patent Publication No. 63(1988)-61430, for example.

The other optical pickup proposal, which is used with a magnetooptic recording medium, includes a single optical waveguide device which has convergent grating couplers and is capable of functioning as a beam splitter, a lens, and a prism, as described above. This optical pickup also includes a semireflecting mirror for differential detection of recorded information.

More specifically, the optical pickup comprises a light source for applying a linearly polarized light beam to a recording surface of a magnetooptic recording medium such as a magnetooptic disc, an objective lens for focusing the light beam onto the recording surface of the magnetooptic recording medium, and an optical waveguide directed such that it receives, on one surface thereof, a light beam reflected from the recording surface of the magnetooptic recording medium.

The optical pickup also has first, second, and third convergent grating couplers on the surface of the optical waveguide, to which surface the reflected light beam is applied, for introducing the reflected light beam into the optical waveguide. The first and second convergent grating couplers are disposed one on each side of an axis which passes substantially through the center of the reflected beam applied to the optical waveguide and also which extends across the surface of the optical waveguide in a direction which is perpendicular to a normal of a track of recorded signals. The first and second convergent grating couplers excite the light beams and cause them to travel in a TE or TM guided mode, and are arranged such that they converge the reflected light beams, which are propagating in the optical waveguide in the same guided mode, toward positions spaced from each other across the axis.

The third convergent grating coupler excites the light beams and causes them to travel in a guided mode different from the guided mode excited by the first and second convergent grating couplers (e.g., a TM guided mode when a TE guided mode is excited by the first and second convergent grating couplers), introduces the reflected light beam into the optical waveguide, and converges the propagating light beam in the optical waveguide.

The optical pickup further has first, second, and third sets of light detectors, which are disposed on the surface or an end face of the optical waveguide and detect the reflected light beams respectively converged by the first, second, and third convergent grating couplers. The optical pickup also includes detecting circuits for detecting tracking and focusing errors based on output signals from the first and second light detectors, and a differential detecting circuit for detecting recorded information based on the difference between the output signals from the first and/or second light detector and an output signal from the third light detector. For further details, reference should be made to Japanese Unexamined Patent Publication No. 63(1988)-188844, for example.

In the above optical pickup, the functions which have heretofore been performed by the beam splitter, the lens, the prism, the semireflecting mirror, and the analyzer are performed by the convergent grating couplers. Therefore, the optical pickup is composed of a highly reduced number of parts, is small and light, can be manufactured much less expensively than the conventional optical pickups, and can access desired recorded information in a shortened access time. Particularly, the cost of the optical pickup is greatly reduced because its major component can easily be mass-produced by the planar process.

With an optical pickup employing an optical waveguide, nevertheless, inasmuch as a light beam reflected from a recording medium is introduced into the optical waveguide through a grating coupler on the surface of the optical waveguide, the light input efficiency tends to vary due to the wavelength selectivity of the grating coupler, as described above.

If a semiconductor laser is employed as a light beam source, a high-frequency current is added to the drive current supplied to the semiconductor laser so that the semiconductor laser will operate in a multiplicity of modes and noise caused by the reentering light will be reduced. When the semiconductor laser is operated in this manner, the light output efficiency may drop sharply because the reflected beam entering the grating coupler has wide range of wavelengths.

When the light input efficiency varies, the intensity of light detected by the light detectors also varies irrespective of the recorded information and the tracking and focusing conditions of the light beam applied to the recording medium. As a result, errors may occur when the recorded information is read, and tracking and focusing errors may be detected improperly.

SUMMARY OF THE INVENTION

It is an object of the present invention to provide a method of coupling external light into an optical waveguide and a guided wave propagating in an optical waveguide with an external device so that any variation in the light input efficiency can be reduced or any variation in a light exit angle can be corrected when the wavelength of the light applied to the optical waveguide changes.

Another object of the present invention is to provide a method of coupling external light into an optical waveguide and a guided wave propagating in an optical waveguide to an external device so that any variation in light input efficiency can be reduced or any variation in a light exit angle can be corrected when the temperature of the substrate of the optical waveguide changes.

Still another object of the present invention is to provide an optical pickup comprising an optical waveguide, the optical pickup being arranged such that the intensity of light detected by the optical pickup will not vary greatly even if the wavelength of a light beam applied to a recording medium with which the optical pickup is used fluctuates.

According to the present invention, there is provided a first method of coupling external light to an optical waveguide a guided wave from an optical waveguide through a grating coupler disposed on a surface of the optical waveguide (which surface may be exposed to either air or a substrate) so as to cope with fluctuations in the wavelength of the light, the method comprising the step of: diffracting the external light with a wavelength-fluctuation-correcting grating in a direction opposite to the direction of diffraction by the grating coupler on the surface of the optical waveguide, while satisfying the Bragg condition defining the Bragg angle $\theta_B$ as:

$$\theta_B = \tan^{-1}\left(\frac{\lambda}{\Lambda_{GC}} \frac{q}{2nc \cos\Phi}\right)$$

where $\lambda$ is the wavelength of the light, $\Lambda_{GC}$ is the period of the grating coupler on the surface of the optical waveguide, $\Phi$ is the angle of incidence of the external light upon or the angle of exit of the external light from the grating coupler on the surface of the optical waveguide, nc is the refractive index of a medium on which the wavelength-fluctuation-correcting grating is disposed, and q is the coupling order number ($=\pm 1, \pm 2, \pm 3, \ldots$) of the grating coupler on the surface of the optical waveguide.

The "direction opposite to the direction of diffraction" is defined as follows: If the direction of diffraction by the grating coupler on the surface of the optical waveguide is on the righthand side, for example, of the direction of travel of the light as viewed in one direction, then the external light is diffracted by the wavelength-fluctuation-correcting grating in a direction on the lefthand side of the direction of travel of the light as viewed in said one direction.

According to the present invention, there is provided a second method of coupling external light into an optical waveguide or a guided wave from an optical waveguide through a grating coupler disposed on a surface of the optical waveguide so as to cope with fluctuations in the wavelength of the light, the method comprising the step of: diffracting the external light with a wavelength-fluctuation-correcting grating in a direction opposite to the direction of diffraction by the grating coupler on the surface of the optical waveguide, while not satisfying the Bragg condition, but satisfying the following equation:

$$\Lambda = \frac{m}{q} \frac{\cos\Phi}{\cos\theta d} \Lambda_{GC}$$

where $\Lambda$ and $\theta d$ are the period of and the angle of diffraction by the wavelength-fluctuation-correcting grating, m and q are the coupling order numbers ($=\pm 1, \pm 2, \pm 3, \ldots$) of the wavelength-fluctuation-correcting grating and the grating coupler on the surface of the optical waveguide, respectively, $\Lambda_{GC}$ is the period of the grating coupler on the surface of the optical waveguide, and $\Phi$ is the angle of incidence of the external light upon or the angle of exit of the external light from the grating coupler on the surface of the optical waveguide.

How fluctuations in the wavelength of the external light are corrected by passing the external light through the wavelength-fluctuation-correcting grating will be described in detail below.

The first method will first be described with respect to an application in which the grating coupler on the surface of the optical waveguide is used to couple or introduce the external light into the optical waveguide. The grating coupler on the surface of the optical waveguide will also be referred to as a "light-introducing grating coupler". The phase matching condition at the light-introducing grating coupler on the surface of the optical waveguide is given by the following equation (see FIG. 6):

$$nc \, k \, \sin\Phi = Nk - qk \quad (2)$$

where $\Phi$ is the angle of incidence of the external light upon the grating coupler, N is the effective refractive index of the optical waveguide, nc is the refractive index of the medium on which the wavelength-fluctuation-correcting grating is disposed, q is the coupling order number ($=1, 2, 3, \ldots$) of the light-introducing grating coupler, and k and K are parameters defined as follows:

$$k = ||k|| = 2\pi/\lambda \quad (3)$$

$$K = ||K|| = 2\pi/\Lambda_{GC} \quad (4)$$

where $|k$ are $|K$ the wave vectors of the light and the grating coupler, respectively, $\lambda$ is the wavelength of the light, and $\Lambda_{GC}$ is the period of the grating coupler. When equation (2) above is satisfied, the light input efficiency is maximum since phase matching is achieved between the external light applied to the optical waveguide and the guided wave propagating in the optical waveguide.

When equations (3) and (4) are substituted into equation (2), the relationship between $\lambda$ and $\Phi$ is defined as follows:

$$\lambda = \frac{\Lambda_{GC}}{q}(N - nc \sin\Phi) \quad (5)$$

Even if the wavelength $\lambda$ of the introduced external light varies, the maximum light input efficiency can be obtained at all times by applying the external light at the incident angle $\Phi$ which satisfies the above equation (5).

The ratio of a change $\Delta\Phi$ in the incident angle to a change or fluctuation $\Delta\lambda$ of the wavelength can be derived by differentiating the equation (5) with respect to $\Phi$ as follows:

$$\frac{\Delta\lambda}{\Delta\Phi} = \frac{\Lambda_{GC}}{q}(-nc \cos\Phi) \quad (6)$$

Hence, $$\frac{\Delta\Phi}{\Delta\lambda} = \frac{-q}{\Lambda_{GC} \, nc \, \cos\Phi} \quad (7)$$

The dependency of the refractive index of the material of the optical waveguide on the wavelength can be regarded as being constant since it is sufficiently smaller than the dependency thereof on the incident angle. FIG. 7 shows the manner in which the incident angle varies when the wavelength of the external light changes from $\lambda$ to $\lambda + \Delta\lambda$. Denoted in FIG. 7 at 11 is a substrate, 12 an optical waveguide, 13 a light-introducing grating coupler, 17 external light (introduced light), and 17' a guided wave. FIG. 8 illustrates the manner in which the wave vectors vary at this time.

The angle through which the external light applied to the wavelength-fluctuation-correcting grating is diffracted varies when the wavelength thereof varies while it is being subjected to Bragg diffraction. The amount by which the angle of diffraction varies will be reviewed below. It is assumed that the wave vectors of the light applied to the grating and the light diffracted and leaving the grating are represented respectively by $|k_i$, $|k_d$, and the wave vector of the wavelength-fluctuation-correcting grating is represented by $|K_B$. As shown in FIG. 9, these wave vectors are related as follows:

$$|K_i - |K_b = d \tag{8}$$

More specifically, if the Bragg angle is indicated by $\theta_B$ as shown in FIG. 10, then we get:

$$2nc\, k_i \sin\theta_B = K_B \tag{9}$$

where $k_i = ||k_i|| = 2\pi/\lambda$, $K_B = ||K_B|| = 2\pi/\Lambda_B$ ($\Lambda_B$ is the period of the grating), and nc is the refractive index of the medium on which the wavelength-fluctuation-correcting grating is disposed.

Now, a state in which the wavelength of the applied external light has changed from $\lambda$ to $\lambda + \Delta\lambda$ while the incident angle remains at $\theta_B$ will be considered. At this time, the condition for Bragg diffraction is no longer satisfied as shown in FIG. 11. The applied light is diffracted so that the law of conservation of momentum in the direction of the wave vector $|K_B$ of the grating will be satisfied. More specifically, $$nc\, k_i' \sin\theta_B - K_B = -nc\, k_d' \sin(\theta_B + \Delta\theta_B) \tag{10}$$

where
$$k_i' = k_d' = 2\pi/(\lambda + \Delta\lambda) \tag{11}$$

From equations (10) and (11), the following equation is obtained:

$$\frac{2\pi}{\lambda + \Delta\lambda} nc(2\sin\theta_B + \cos\theta_B \cdot \Delta\theta) = \frac{2\pi}{\Lambda_B} \tag{12}$$

Since $\Delta\theta << 1$, it is assumed that $\cos\theta_B = 1$ and $\sin\Delta\theta = \Delta\theta$ in the above equation. From equation (9), we get $$\lambda = 2cn\, \Lambda_B \sin\theta_B \tag{13}$$

When equation (13) is substituted into equation (12), the following equations are obtained:

$$nc\, \cos\theta_B \Delta\theta_B = \Delta\lambda/\Lambda_B \tag{14}$$

$$\text{Hence, } \frac{\Delta\theta_B}{\Delta\lambda} = \frac{1}{nc\Lambda_B \cos\theta_B} \tag{15}$$

Equation (15) represents the amount $\Delta\theta_B$ by which the angle of diffraction varies as the wavelength of the applied light varies by $\Delta\lambda$.

If the amount of change $\Delta\Phi$ in the optimum angle $\Phi$ of incidence of the external light upon the light-introducing grating coupler, which change is caused by a wavelength fluctuation, and the amount of change $\Delta\theta$ in the angle of diffraction are equal to each other, and if these angles vary in directions such that the amounts $\Delta\Phi$ and $\Delta\theta$ are canceled, then it becomes possible to correct such a wavelength fluctuation and to apply the external light to the light-introducing grating coupler at the optimum incident angle at all times. Stated otherwise, the wavelength fluctuation can automatically be corrected by satisfying the equation:

$$-\frac{\Delta\Phi}{\Delta\lambda} = \frac{\Delta\theta_B}{\Delta\lambda} \tag{16}$$

When equations (7) and (15) are substituted into equation (16), while taking into account the direction in which the angles vary, the following equation (17) is obtained:

$$\frac{q}{nc\, \Lambda_{GC} \cos\Phi} = \frac{1}{nc\, \Lambda_B \cos\theta_B} \tag{17}$$

Furthermore, equation (13), which must be satisfied in order for the phase matching condition to be achieved by the wavelength-fluctuation-correcting grating, is substituted into equation (17), the following equation (18) results:

$$\frac{q}{nc\, \Lambda_{GC} \cos\Phi} = \frac{1}{\cos\theta_B} = \frac{2\sin\theta_B}{\lambda}$$

$$1 = 2\tan\theta_B \frac{1}{\lambda}$$

Hence, $$\theta_B = \tan^{-1}\left(\frac{\lambda}{\Lambda_{GC}} \frac{q}{2nc\cos\Phi}\right) \tag{18}$$

The angle expressed by equation (18) is the Bragg angle $\theta_B$ referred to in the first method of the present invention. When the external light is applied to the light-introducing grating coupler at the incident angle $\Phi$, if it is passed through a wavelength-fluctuation-correcting grating which satisfies the Bragg condition giving the Bragg angle $\theta_B$ defined by equation (18), then the incident angle $\Phi$ varies depending on any fluctuation in the wavelength of the light so that the external light will be applied at an optimum incident angle at all times. Thereby variations in the light input efficiency are suppressed. The periods $\Lambda_{GC}$, $\Lambda_B$ of the light-introducing grating coupler and the wavelength-fluctuation-correcting grating at this time are given by equations (5) and (13), respectively.

The second method of the present invention will be described below.

As shown in FIG. 12, the angle through which the external light applied to a wavelength-fluctuation-correcting grating 50 is diffracted varies when the wavelength thereof varies while it is being diffracted by the grating coupler 50. The amount by which the angle of diffraction varies will be reviewed below. As shown in FIG. 13, it is assumed that incident light i having a wave vector $|k_i$ is applied at an incident angle $\theta_i$ to the wavelength-fluctuation-correcting grating 50 whose period is $\Lambda$ and diffracted thereby into diffracted light d having a wave vector $|k_d$ and leaving the grating coupler 50 at a light exit angle $\theta_d$. As described above, when the condition for Bragg diffraction is not satisfied, the incident light i is diffracted so as to meet the law of conservation of momentum in the direction of the wave vector $|K$ of the grating coupler 50. Therefore, $$nc\ ki\ \sin\theta i - mK = nc\ kd\ \sin(-\theta d) \qquad (19)$$

Hence, $$\frac{2\pi}{\lambda}\ nc\ (\sin\theta i + \sin\theta d) = \frac{2m\pi}{\Lambda} \qquad (20)$$

where $ki = kd = 2\pi/\lambda$, and m is the coupling order number ($= \pm 1, \pm 2, \pm 3, \ldots$) of the wavelength-fluctuation-correcting grating coupler.

Now, a state in which the wavelength of the applied external light has changed from $\lambda$ to $\lambda + \Delta\lambda$ while the incident angle remains at $\theta_i$ will be considered. At this time, as shown in FIG. 14, $$nc\ ki'\ \sin\theta i - m_K = -nc\ kd'\ \sin(\theta d + \Delta\theta)$$

Hence, $$\frac{2\pi}{\lambda + \Delta\lambda}\ nc\ \{\sin\theta i + \sin(\theta d + \Delta\theta)\} = \frac{2m\pi}{\Lambda} \qquad (21)$$

From equations (20) and (21), we get $$nc\ \cos\theta d \cdot \Delta\theta = m\frac{\Delta\lambda}{\Lambda}$$

$$\Delta\theta/\Delta\lambda = m/(nc\ \cos\theta d \cdot \Lambda) \qquad (22)$$

Since $\Delta\theta \ll 1$, it is assumed that in the above equation $\cos\theta_B = 1$ and $\sin\Delta\theta = \Delta\theta$. When equations (7) and (22) are substituted into equation (16), the following equations are obtained:

$$\frac{q}{nc\ \Lambda_{GC}\ \cos\theta} = \frac{m}{\Lambda\ \cos\theta d} \qquad (23)$$

$$\Lambda = \frac{m}{q}\ \frac{\cos\Phi}{\cos\theta d}\ \Lambda_{GC}$$

Equation (23) is representative of the relationship between the period $\Lambda$ of the grating coupler and the angle $\theta d$ of diffraction in the second method of the present invention. Thus, by diffracting the external light at an angle $\theta d$ with a wavelength-fluctuation-correcting grating whose period is $\Lambda$, the light input efficiency is prevented from varying because of fluctuations in the wavelength of the applied light. The incident angle $\theta i$ may be selected to satisfy equation (20).

In the foregoing description, the grating coupler on the surface of the optical waveguide serves to introduce the external light into the optical waveguide. The grating coupler on the surface of an optical waveguide may also be employed to emit the guided wave as light from the optical waveguide. When the light emitted from the optical waveguide through the grating coupler on the optical waveguide is passed through the wavelength-fluctuation-correcting grating, even if the light exit angle at which the light is emitted from the grating coupler varies as the wavelength of the light varies, the external light emitted from the wavelength-fluctuation-correcting grating travels along a substantially constant direction, as can be understood from the theorem of reciprocity with respect to the light introduced into an the light emitted from the optical waveguide.

The external light is applied to the optical waveguide through a surface of the optical waveguide which is exposed to air, as is described above. However, the methods of the present invention are also applicable to cases where the external light is applied to the grating coupler and introduced into the optical waveguide through the substrate thereof and the guided wave is emitted from the optical waveguide through the grating coupler and the substrate thereof. It is preferable that the interference between the substrate and the medium on which the wavelength-fluctuation-correcting grating is disposed be substantially perpendicular to the path of the light.

According to the present invention, there is provided a third method of coupling external light to an optical waveguide or a guided wave from an optical waveguide through a grating coupler disposed on the surface of the optical waveguide (which surface may be exposed to either air or a substrate) so as to cope with changes in the temperature of the substrate of the optical waveguide, the method comprising the step of: passing the external light through an end surface of the substrate of the optical waveguide so that the light is refracted in the same direction as the direction of diffraction by the grating coupler on the surface of the optical waveguide, the end surface being inclined with respect to the optical waveguide at an angle $\alpha$ defined by:

$$\alpha = \tan^{-1}\left(\frac{\delta - \sin\Phi}{\cos\Phi}\right) + \Phi \qquad (24)$$

where $\delta$ is the ratio of the effective refractive index N of the optical waveguide to the refractive index n of the substrate at a desired temperature $t_o$, and $\Phi$ is the angle of incidence of the external light upon or the angle of exit of the external light from the grating coupler at the temperature $t_o$.

The "same direction as the direction of diffraction" is defined as follows: If the direction of diffraction by the grating coupler on the surface of the optical waveguide is on the righthand side, for example, of the direction of travel of the light as viewed in one direction, then the external light is diffracted by the wavelength-fluctuation-correcting grating in a direction on the righthand side of the direction of travel of the light as viewed in said one direction.

How fluctuations in the wavelength of the external light are corrected by passing the external light through the end surface of a substrate which is inclined at an angle u with respect to the optical waveguide will be described in detail below.

The third method will be described with respect to an application in which the grating coupler on the surface of the optical waveguide is used to couple or introduce external light into the optical waveguide. In the third method, the external light is applied to the optical waveguide through the substrate thereof. Therefore, the phase matching condition at the grating coupler on the surface of the optical waveguide, i.e., the light-introducing grating coupler, is expressed by equation (1), as was explained above:

$$n\ k\ \sin\Phi = Nk - mK \qquad (1)$$

where $k = 2\pi/\lambda$, $K = 2\pi/\Lambda$.

The ratio $\delta$ of the effective refractive index N of the optical waveguide to the refractive index n of the substrate thereof is regarded as being constant irrespective of the refractive index n of the substrate. From equation (1), the refractive index n is expressed by:

$$n = \frac{m\lambda}{\Lambda} \frac{1}{\delta - \sin\Phi} \quad (25)$$

By differentiating equation (25) with respect to $\Phi$, we get $$\frac{dn}{d\Phi} = \frac{\Lambda}{m\lambda} n^2 \cos\Phi \quad (26)$$

How the angle of incidence of the external light that has been refracted by the end surface of the substrate upon the grating coupler depends on the refractive index n of the substrate will be considered below. As shown in FIG. 16, it is assumed that the angle formed between an end surface 111a of a substrate 111 and an optical waveguide 112 is indicated by $\alpha$, the angle of incidence of the external light upon the end surface 111a is indicated by $\theta 1$, the angle of exit of the external light from the end surface 111a is indicated by $\theta 2$, the angle of incidence of the external light upon a grating coupler 113 is indicated by $\Phi$, and the refractive index of the medium surrounding the optical waveguide is indicated by nc. From the equations:

$$\sin\theta 1/\sin\theta 2 = n/nc, \text{ and}$$

$$\alpha - \Phi = \theta 2,$$

we obtain $n = nc \sin\theta 1/\sin(\alpha - \Phi)$. When this equation is differentiated with respect to $\Phi$, the following equation (27) is obtained:

$$\frac{dn}{d\Phi} = nc\sin\theta 1 \frac{\cos(\alpha - \Phi)}{\sin^2(\alpha - \Phi)} \quad (27)$$

$$= n \frac{1}{\tan(\alpha - \Phi)}$$

In order to obtain an incident angle $\Phi$ which will satisfy the phase matching condition at all times regardless of changes in the refractive index of the substrate, $dn/d\Phi$ with respect to the incidence upon the grating coupler and $dn/d\Phi$ with respect to the refraction by the end surface may be equal to each other and in the same direction. Therefore, the angle $\alpha$ which satisfies both equation (27) and equation (26) is determined as follows: From the equation:

$$\frac{\Lambda}{m\lambda} n^2 \cos\Phi = n \frac{1}{\tan(\alpha - \Phi)}$$

the angle $\alpha$ is expressed as follows:

$$\alpha = \tan^{-1}\left(\frac{m\lambda}{\Lambda} \frac{1}{n\cos\Phi}\right) + \Phi$$

From equation (25) $m\lambda/(n\Lambda) = \delta - \sin\Phi$. When this is substituted into the above equation, the angle $\alpha$ becomes:

$$\alpha = \tan^{-1}\left(\frac{\delta - \sin\Phi}{\cos\Phi}\right) + \Phi$$

which is the same as equation (24) referred to above.

As is clear from the above description, if the angle formed between the end surface of the substrate and the optical waveguide is made equal to $\alpha$ and the grating coupler is constructed so it achieves the phase matching condition between the external light and the guided wave with the incident angle $\Phi$, the incident angle $\Phi$ will compensate for changes in the refractive index n of the substrate and the effective refractive index N of the optical waveguide in equation (1) above and vary to satisfy equation (1) at all times, due to the refractive index of the substrate changing (i.e., the light exit angle $\theta 2$ at the end surface of the substrate changing). Therefore, the light input efficiency of the grating coupler is kept at a high level.

In the above description, the grating coupler on the surface of the optical waveguide serves to introduce the external light into the optical waveguide. However, if the external light emitted from the grating coupler is passed through the end surface of a substrate which is inclined at the angle u with respect to the optical waveguide, then variations in the light exit angle at which the light is emitted from the grating coupler will be compensated for, as can be understood from the theorem of reciprocity referred to above.

The foregoing description is based on the fact that the ratio $\delta$ of the effective refractive index N of the optical waveguide to the refractive index n of the substrate is constant regardless of changes in the refractive index n. Actually, the ratio $\delta$ remains constant with many optical waveguide devices. However, the third method of the present invention is also effective for optical waveguide devices in which the ratio $\delta$ varies slightly as the refractive index n varies. With the angle $\alpha$ being determined according to equation (24) in such optical waveguide devices, the light input efficiency, if the light is introduced into the optical waveguide through the end surface of the substrate, can be kept at a higher level than if the angle $\alpha$ were not determined according to equation (24), though the phase matching at the grating coupler may be degraded somewhat, when the temperature of the substrate varies, and variations in the light exit angle at the end surface of the substrate, if the light is emitted from the optical waveguide through the end surface of the substrate, can be suppressed less well when the substrate temperature varies than if the angle $\alpha$ had not been determined according to equation (24).

Optical pickups according to the present invention will be described below.

A first optical pickup according to the present invention applies a light beam to the surface of an optical recording medium or a magnetooptic recording medium, diffracts the light beam reflected from the recording medium with a light-introducing grating coupler on a surface of an optical waveguide (which may be exposed to air or a substrate of the optical waveguide), introduces the diffracted light beam into the optical waveguide, and detects the light beam, which has been converged in the optical waveguide, with light detectors used for reading information recorded on the recording medium and detecting tracking and focusing errors. The first optical pickup includes a wavelength-fluctuation-correcting grating for diffracting the reflected light beam, before it is applied to the light-introducing grating coupler, in a direction opposite to the direction of diffraction by the light-introducing grating coupler, the wavelength-fluctuation-correcting grating being arranged such that it diffracts the reflected light beam while satisfying the Bragg condition defining the Bragg angle $\theta_B$ as:

$$\theta_B = \tan^{-1}\left(\frac{\lambda}{\Lambda_{GC}} \frac{q}{2nc\cos\Phi}\right)$$

which is the same as equation (18) referred to above, where $\lambda$ is the wavelength of the light, $\Lambda_{GC}$ is the period of the light-introducing grating coupler, $\Phi$ is the angle of incidence of the external light upon the light-introducing grating coupler, nc is the refractive index of a medium on which the wavelength-fluctuation-correcting grating is disposed, and q is the coupling order number ($=\pm 1, \pm 2, \pm 3, \ldots$) of the light-introducing grating coupler.

A second optical pickup according to the present invention also diffracts the light beam reflected from the recording medium with the wavelength-fluctuation-correcting grating in a direction opposite to the direction of diffraction by the light-introducing grating coupler. However, the wavelength-fluctuation-correcting grating does not satisfy the Bragg condition, but satisfies equation (23) referred to above:

$$\Lambda = \frac{m}{q} \frac{\cos\Phi}{\cos\theta d} \Lambda_{GC}$$

where $\Lambda$ and $\theta d$ are the period of and the angle of diffraction by the wavelength-fluctuation-correcting grating, m and q are the coupling order numbers ($=\pm 1, \pm 2, \pm 3, \ldots$) of the wavelength-fluctuation-correcting grating and the light-introducing grating coupler, respectively, $\Lambda_{GC}$ is the period of the light-introducing grating coupler, and $\Phi$ is the angle of incidence of the reflected light beam upon the light-introducing grating coupler.

Variations in the wavelength of the reflected beam can be corrected by passing the reflected beam through the wavelength-fluctuation-correcting grating for the reasons described above with regard to the first and second methods of the present invention.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 18 is a graph showing the relationship between the amount by which the temperature of a substrate varies and the light input efficiency with which light is applied to a grating coupler;

DESCRIPTION OF THE PREFERRED EMBODIMENTS

Figure 1:
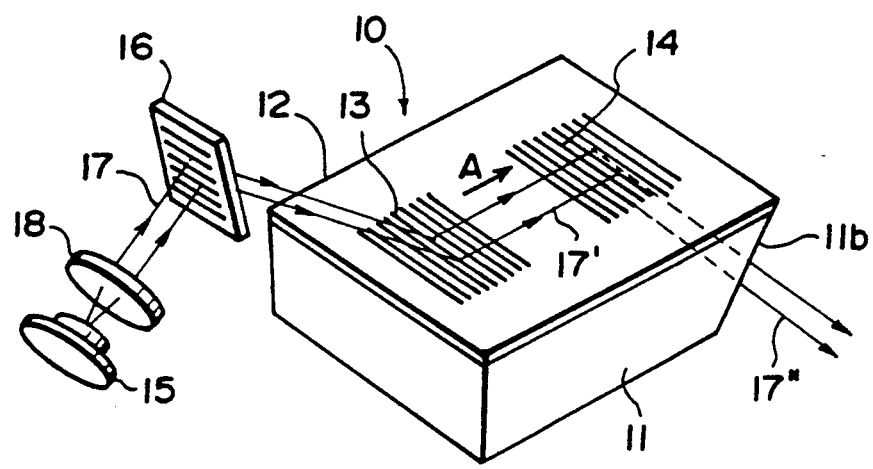
FIG. 1 is a perspective view of an optical waveguide device for carrying out a first method of the present invention.

Like or corresponding reference numerals denote like or corresponding parts throughout the views.

Figure 2:
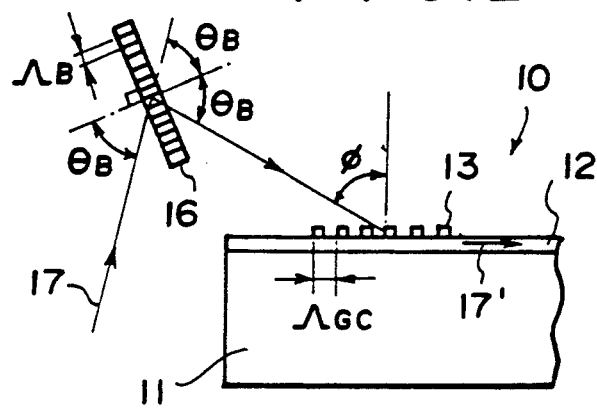
FIG. 2 is a fragmentary side elevational view of the optical waveguide device shown in FIG. 1.

FIGS. 1 and 2 show an optical waveguide device for introducing external light into an optical waveguide according to a first method of the present invention. The optical waveguide device, generally denoted at 10, has a slab-shaped optical waveguide 12 disposed on a transparent substrate 11, a linear grating coupler 13 for introducing a light beam (hereinafter also referred to as an "LGC 13" or a "light-introducing LGC 13"), and a linear grating coupler 14 for emitting a light beam (hereinafter also referred to as an "LGC 14" or a "light-emitting LGC 14") from the optical waveguide, the LGCs 13, 14 being disposed on the exposed surface of the optical waveguide 12 and spaced from each other.

For example, a wafer of $LiNbO_3$ may be used as the substrate 11 and a Ti-diffused film may form the optical waveguide 12 on the wafer. The substrate 11 may otherwise comprise a crystalline substrate of sapphire, Si, or the like. Instead of the Ti-diffused film being used, the optical waveguide 12 be formed by sputtering, evaporating or otherwise depositing any of various other materials on the substrate 11.

A semiconductor laser 15 is positioned such that it emits a light beam (laser beam) 17 toward a wavelength-fluctuation-correcting grating 16. The light beam 17, which is a divergent beam in nature, is converted by a collimator lens 18 to a parallel beam, which is applied to and diffracted by the wavelength-fluctuation-correcting grating 16. The diffracted light beam 17 is then applied to the LGC 13 on the optical waveguide 12 and diffracted by the LGC 13 into the optical waveguide 12. The light beam 17 propagates as a guided wave 17' in a guided mode in the optical waveguide 12 in the direction indicated by the arrow A. The guided wave 17' is also diffracted by the LGC 14 and emitted as an external light beam 17" from the optical waveguide 12 into the substrate 11. The light beam 17" from the optical waveguide 12 is then emitted out of the device 10 from an end surface 11b of the substrate 11.

How the wavelength-fluctuation-correcting grating 16 functions will be described below. In the illustrated embodiment, the light beam 17 has a wavelength (a central reference wavelength) $\lambda=780$ nm, the LGC 13 has a period $\Lambda_{GC}=603$ nm, the optical waveguide 12 has an effective refractive index $N=2.21$, and the angle of incidence of the light beam 17 upon the LGC 13 is $\Phi=65°$. The Bragg angle $\theta_B$ at the wavelength-fluctuation-correcting grating 16 is 56.8°, which satisfies equation (18) referred to above. Therefore, assuming that $q=1$ and $nc=1$, $$\theta_B = \tan^{-1}\left(\frac{780 \times 1}{603 \times 2 \times 1 \times \cos 65°}\right) = 56.8°$$

From equation (13) above, the period $\Lambda_B$ of the grating 16 as given as:

$$\Lambda_B = \frac{780}{2 \times \sin 56.8°} = 466 \text{ nm}$$

thus satisfying the Bragg condition.

As described above, the direction in which the light beam 17 is diffracted by the wavelength-fluctuation-correcting grating 16 is opposite to the direction in which the light beam 17 is diffracted by the LGC 13. More specifically, since the light beam 17 is diffracted leftwardly of its direction of travel by the LGC 13, as shown in FIG. 2, the light beam 17 is diffracted rightwardly of its direction of travel by the wavelength-fluctuation-correcting grating 16.

Since the external light beam 17 is first diffracted by the wavelength-fluctuation-correcting grating 16 and then introduced into the optical waveguide 12 the incident angle $\Phi$ varies as the wavelength of the light beam 17 varies for the reasons described above, so that the light input efficiency with which the light beam 17 is applied to the LGC 13 is kept at a substantially constant level. With the arrangement of the illustrated embodiment, any variations in the light input efficiency $\eta$ are kept below 1% even if the wavelength $\lambda$ of the light beam 17 fluctuates ±100 nm from the central wavelength of 780 nm.

Another optical waveguide device for carrying out the first method of the present invention will be described below. The optical waveguide device is of basically the same arrangement as that shown in FIG. 1, and the light beam is applied to the LGC 13 from the air side, i.e., from the side opposite to the substrate 11. When the wavelength of the light beam 17 is $\lambda=830$ nm, the period of the LGC 13 is $\Lambda_{GC}=830$ nm, and the incident angle is $\Phi=30°$, the period of the wavelength-fluctuation-correcting grating 16 is $\Lambda_B=830$ nm and the Bragg angle is $\theta_B=30°$. Under these conditions, the grating 16 satisfies the Bragg condition and corrects fluctuations in the wavelength of the light beam 17 applied thereto.

Figure 3:
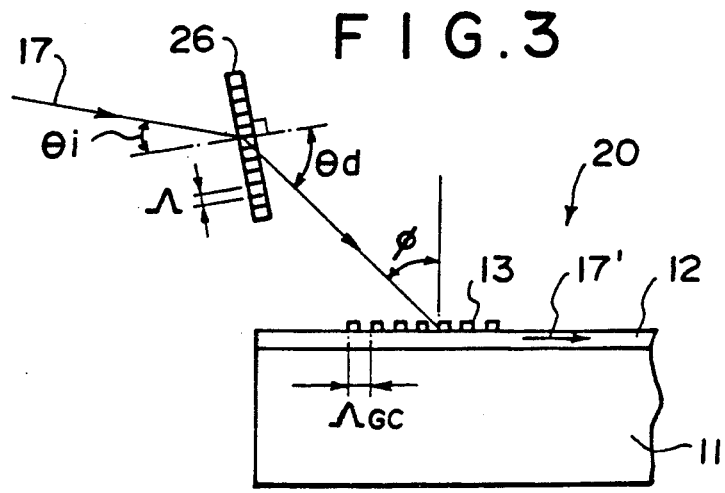
FIG. 3 is a fragmentary side elevational view of an optical waveguide device for carrying out a second method of the present invention.

A second method according to the present invention will be described with reference to FIG. 3. FIG. 3 shows an optical waveguide device 20 for carrying out the second embodiment. The optical waveguide device 20 is composed of essentially the same elements as those of the optical waveguide device 10 shown in FIG. 1. Those identical elements are denoted by identical reference numerals, and will not be described in detail unless specifically required. In the optical waveguide device 20, the wavelength (central wavelength) of the light beam 17 is $\lambda=780$ nm, the period of the LGC is $\Lambda_{GC}=603$ nm, the effective refractive index of the optical waveguide 12 is $N=2.2$, and the angle of incidence of the light beam 17 upon the LGC 13 is $\Phi=65°$. To satisfy equation (23), the period of a wavelength-fluctuation-correcting grating 26 is $\Lambda=985$ nm, and the angle of diffraction becomes $\theta d=75°$. Therefore, with $m=1$, $q=1$, and $nc=1$, we get $$985 = \frac{1}{1} \times \frac{\cos 65°}{\cos 75°} \times 603$$

Under the above conditions, fluctuations in the wavelength of the light beam 17 are corrected, which suppresses variations in the light input efficiency at the LGC 13.

Another optical waveguide device for carrying out the second method of the present invention will be described below. The optical waveguide device is of basically the same arrangement as that shown in FIG. 3, and the light beam is applied to the LGC 13 from air, i.e., from the side opposite to the substrate 11. When the wavelength of the light beam 17 is $\lambda=830$ nm, the period of the LGC 13 is $\Lambda_{GC}=1047$ nm, and the incident angle is $\Phi=45°$, the period of the wavelength-fluctuation-correcting grating 16 is $\Lambda=1047$ nm and the angle of diffraction is $\theta d=45°$. Under these conditions, the grating 16 corrects fluctuations in the wavelength of the light beam 17 applied thereto.

Figure 4:
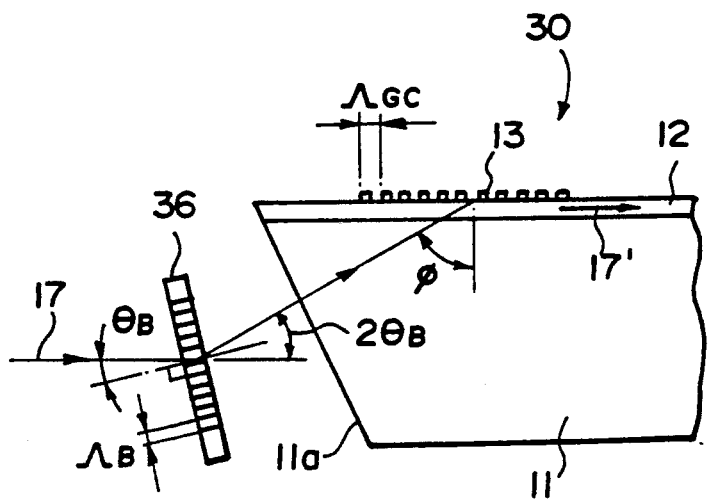
FIGS. 4 and 5 are fragmentary side elevational views of other optical waveguide devices for carrying out the methods of the present invention.

In the above embodiments, the external light is applied from the air side to the LGC 13 on the surface of the optical waveguide. However, the methods of the invention are also applicable to an optical waveguide device 30 as shown in FIG. 4 in which the external light beam 17 is introduced into the substrate 11 through an end surface 11a thereof, and then applied from the substrate 11 to the LGC 13, through which the light beam 17 is introduced into the optical waveguide 12. A wavelength-fluctuation-correcting grating 36 shown in FIG. 4 serves to carry out the first method of the present invention. The Bragg angle $\theta_B$ and the incident angle $\Phi$ are defined as shown in FIG. 4. The second method of the present invention can also be carried out by the illustrated arrangement in which the external light is introduced from the substrate into the optical waveguide.

When the light beam 17 is to be introduced from the substrate 11 into the optical waveguide, the light beam 17 should preferable be applied substantially perpendicularly to the end surface 11a of the substrate 11. When the light beam 17 is applied in this manner, any refraction of the light beam by the end surface 11a is minimized and errors are reduced in the correction of wavelength fluctuations.

Figure 5:
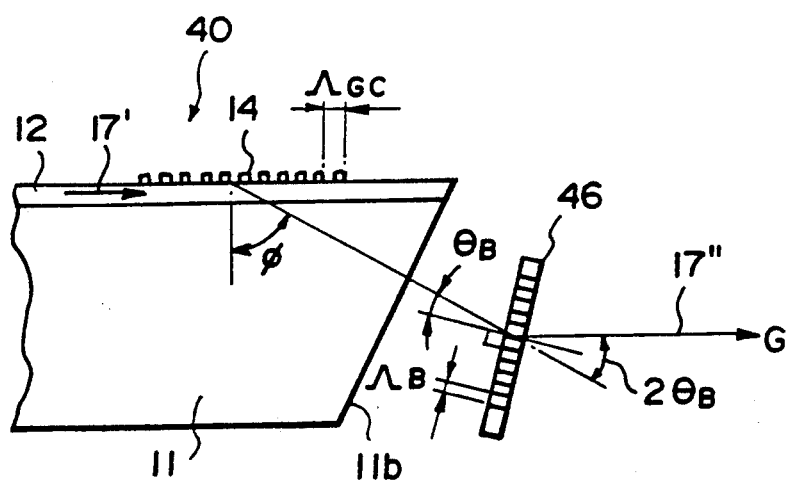
Figure 6:
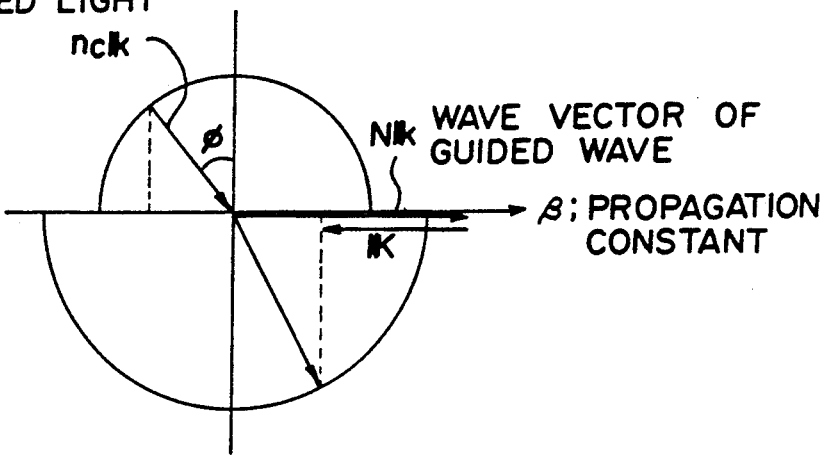
FIG. 6 is a diagram showing wave vectors for a phase matching condition to be satisfied by a grating coupler.
Figure 7:
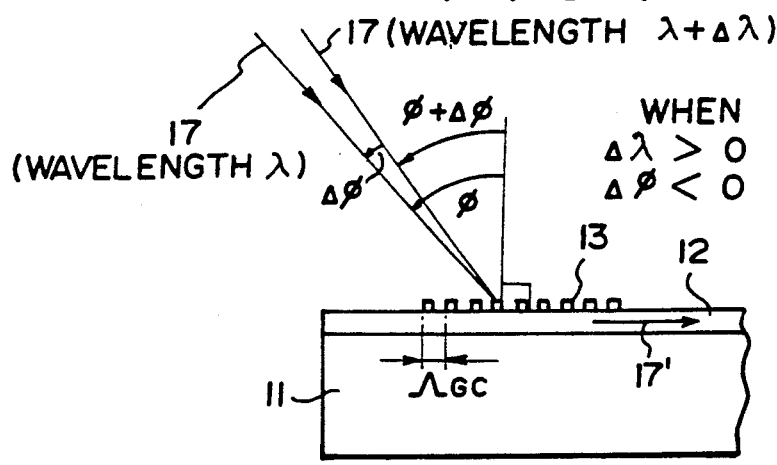
FIG. 7 is a fragmentary side elevational view showing the manner in which the angle of incidence of light upon a grating coupler varies as the wavelength of the light varies.
Figure 8:
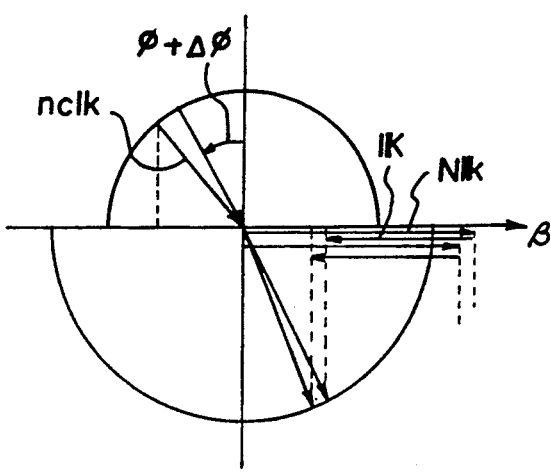
FIG. 8 is a diagram showing how wave vectors vary when the light wavelength varies; diffraction.
Figure 9:
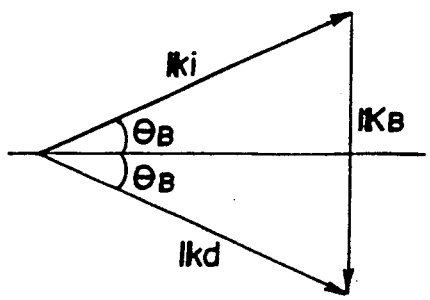
FIG. 9 is a diagram of wave vectors in Bragg diffraction.
Figure 10:
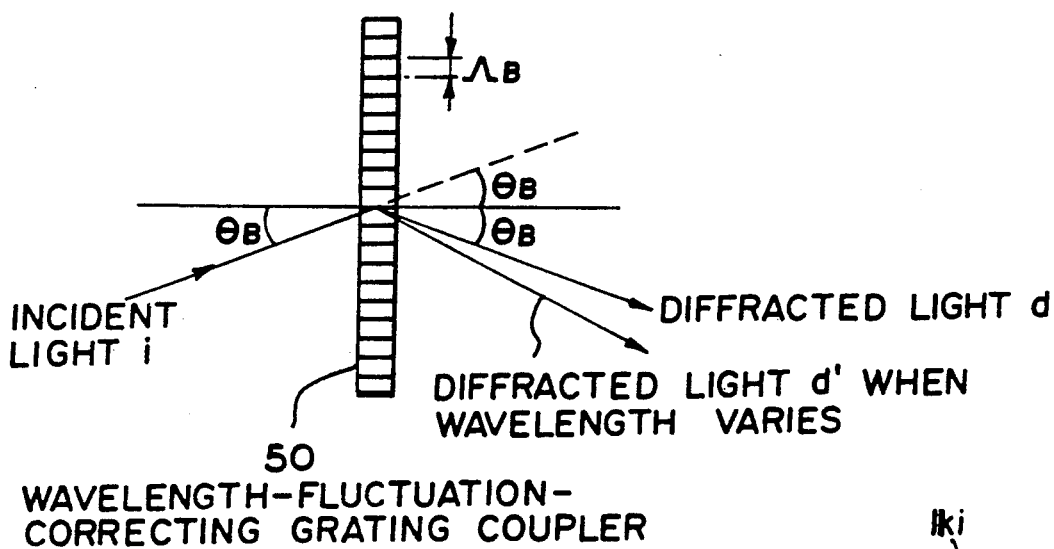
FIG. 10 is a view illustrative of Bragg diffraction by a wavelength-fluctuation-correcting grating.
Figure 11:
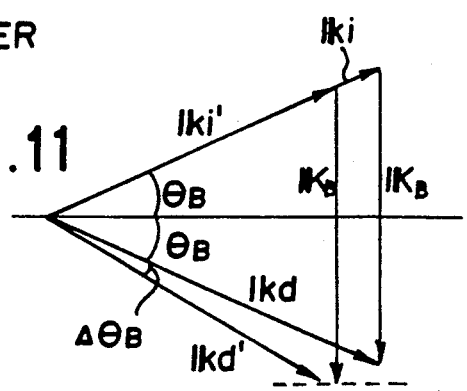
FIG. 11 is a diagram showing the manner in which light is diffracted by the wavelength-fluctuation-correcting grating when the light wavelength varies.
Figure 12:
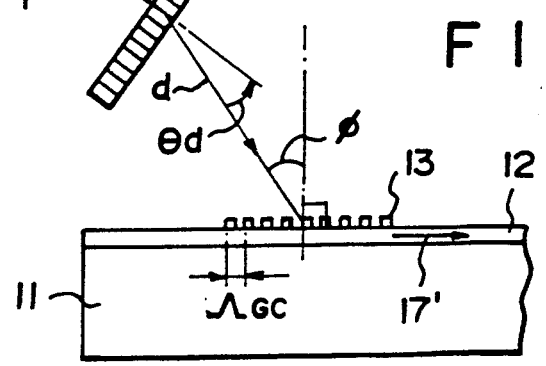
FIG. 12 is a fragmentary side elevational view illustrative of the diffraction of external light by a wavelength-fluctuation-correcting grating according to the second method of the present invention.
Figure 13:
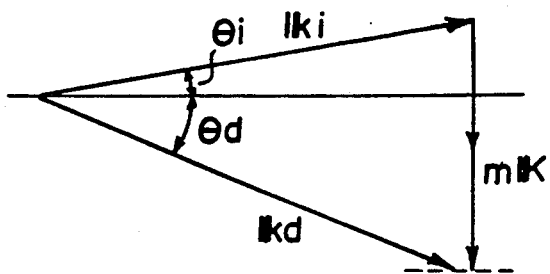
FIGS. 13 and 14 are diagrams showing the manner in which light is diffracted by the wavelength-fluctuation-correcting grating shown in FIG. 12.
Figure 14:
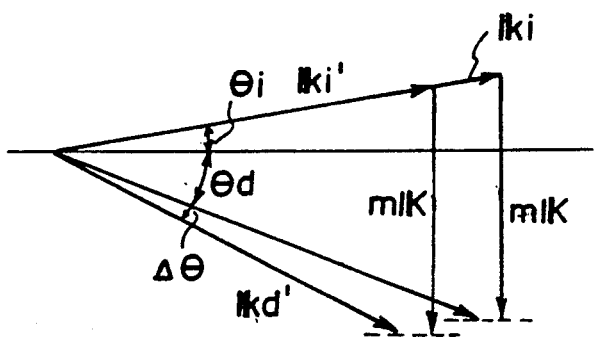
Figure 15:
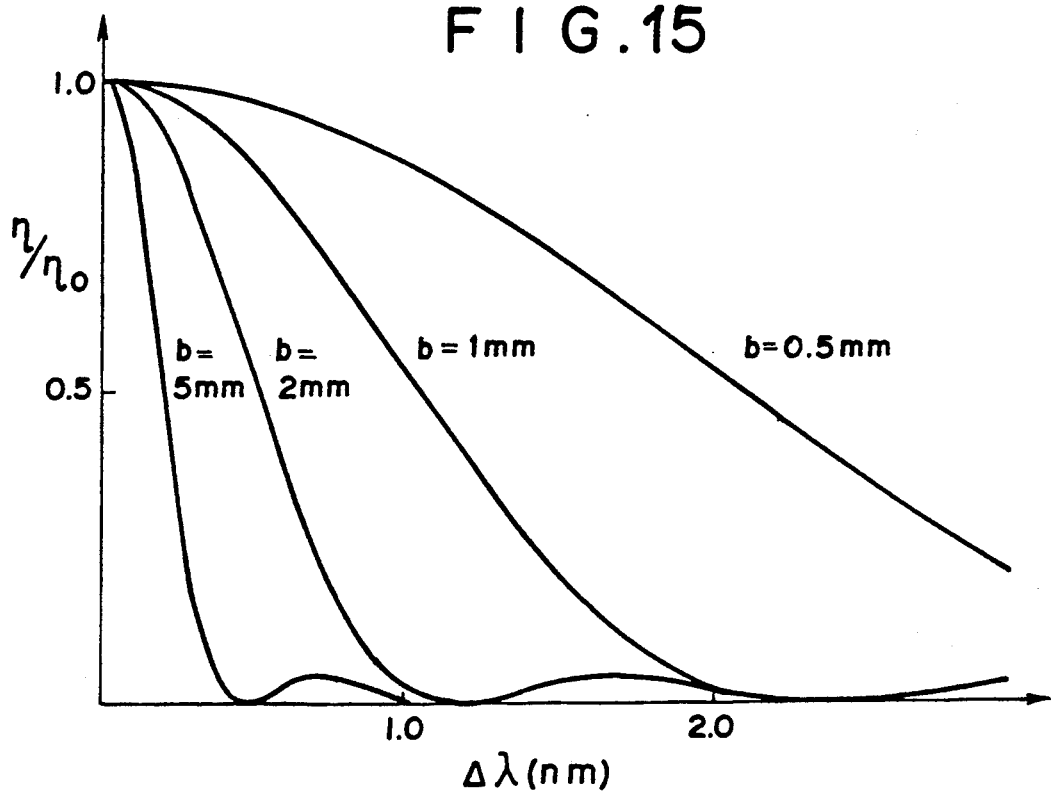
FIG. 15 is a graph showing the relationship between the amount by which the light wavelength varies and the light input efficiency with which light is introduced into an optical waveguide.

The first and second methods of the present invention are also applicable to the emission of a guided wave as external light from an optical waveguide. FIG. 5 shows an optical waveguide device 40 for emitting a guided wave as external light. A wavelength-fluctuation-correcting grating 46 is disposed in the path of a light beam 17″ which has been diffracted by the LGC 14 and emitted out of the optical waveguide 12. The light beam 17″, which has been emitted as external light, is diffracted by the wavelength-fluctuation-correcting grating 46 and travels in the direction indicated by the arrow G. The direction in which the light beam 17″ is diffracted by the wavelength-fluctuation-correcting grating 46 is opposite to the direction in which the light beam or guided wave 17′ is diffracted by the LGC 14.

In cases where the first and second methods of the invention are applied to the emission of a guided wave from an optical waveguide, the external light leaving the wavelength-fluctuation-correcting grating 46 travels in a substantially constant direction for the reasons described above even if the angle at which the light beam is emitted from the LGC 14 varies due to changes in the light wavelength.

In the foregoing embodiments, the first and second methods of the present invention are applied to either the introduction of the light beam to or the emission of the light beam from the optical waveguide. However, the methods of the present invention may be applied to both the introduction of the light beam to and the emission of the light beam from a single optical waveguide.

In the first and second methods of the present invention, the wavelength-fluctuation-correcting grating may comprise a general grating having slits or grooves, a blazed grating, a refractive index modulation grating, or a reflection grating. If a thick grating (with Q being 10 or higher) is employed, then the diffraction efficiency will be higher.

According to the first and second methods of the present invention, as described above, the light input efficiency can be maintained at a substantially constant level by diffracting the external light with the wavelength-fluctuation-correcting grating, even if the wavelength of the external light varies as it is introduced into the optical waveguide. Therefore, the methods of the invention are effective in keeping the efficiency with which the light is utilized high at all times. The methods of the invention are applicable to a device in which a guided wave propagating in an optical waveguide is continuously diffracted and deflected by a surface elastic wave, and then emitted out of the optical waveguide. The deflected light beam which is emitted from the optical waveguide scans a recording medium so that an image can be recorded thereon or a recorded image can be read therefrom. In such an application, the intensity of the light beam applied to the recording medium is stabilized, which allows the image to be recorded or read with a high accuracy. A semiconductor laser is often used as a light source for generating the light beam which is to be introduced into the optical waveguide. With the present invention, however, an accurate temperature regulating device need not be associated with the semiconductor, and hence the entire optical waveguide device can be smaller and less expensive. The optical waveguide device is further reduced in size and cost since the light input efficiency is always stable even if the light beam is directly modulated by the semiconductor laser.

According to the first and second methods of the present invention, moreover, the external light emitted out of the optical waveguide may be diffracted by the wavelength-fluctuation-correcting grating, so that variations in the light exit angle due to fluctuations in the light wavelength can be corrected and the light which leaves the wavelength-fluctuation-correcting grating will travel in a substantially constant direction. Consequently, no complex optical system for correcting variations in the light exit angle is required. If the methods of the invention are applied to the recording or reading of images as described above, any positional displacements or fluctuations of the scanning light beam due to light wavelength variations are prevented from occurring. As a result, images can be recorded or read with increased accuracy.

A third method of the present invention will be described below.

Figure 16:
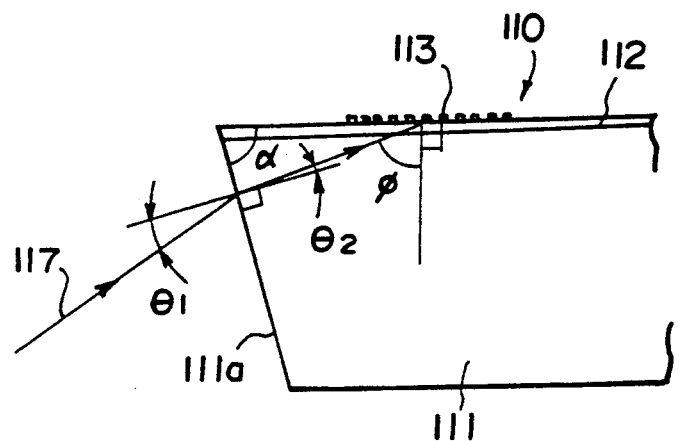
FIG. 16 is a fragmentary side elevational view of an optical waveguide device for carrying out a third method of the present invention.
Figure 17:
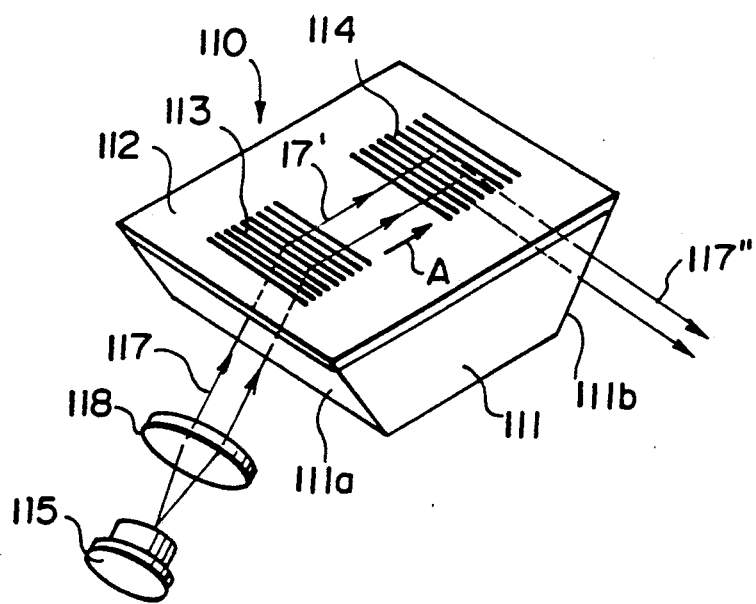
FIG. 17 is a perspective view of the optical waveguide device shown in FIG. 16.

FIGS. 16 and 17 show an optical waveguide device for introducing external light into an optical waveguide according to the third method of the present invention. The optical waveguide device, generally denoted at 110, has a slab-shaped optical waveguide 112 disposed on a transparent substrate 111, a light-introducing LGC 113 and a light-emitting LGC 114 which are disposed on the exposed surface of the optical waveguide 112 and spaced from each other.

In this embodiment, a wafer of $LiNbO_3$ may be used as the substrate 111, and a Ti-diffused film may form the optical waveguide 112 on the wafer.

A semiconductor laser 115 is positioned such that it emits a light beam (laser beam) 117 having a wavelength $\lambda = 0.788$ $\mu$m toward the LGC 113. The light beam 117, which is a divergent beam in nature, is converted by a collimator lens 118 to a parallel beam, which passes through an obliquely cut end surface 111a of the substrate 111 and is applied from the substrate 111 to the LGC 113. The light beam 117 is then diffracted by the LGC 113 and introduced into the optical waveguide 112, where it propagates as a guided wave 117′ in a guided mode in the direction indicated by the arrow A. The guided wave 117′ is also diffracted by the LGC 114 and emitted as an external light beam 117″ from the optical waveguide 112 into the substrate 111. The light beam 117″ from the optical waveguide 112 is then emitted out of the device 110 from an end surface 111b of the substrate 111.

The reference temperature around which the various elements of the optical waveguide device 110 are designed is $t_o = 25°$ C., and at this temperature the angle of incidence of the light beam 117 upon the LGC 113 is $\Phi = 65°$. At this time, the refractive index of the substrate 111 is $n = 2.1743$, the effective refractive index of the optical waveguide 112 is $N = 2.1793$, and hence $\delta = N/n = 1.0023$. Under these conditions, the light input efficiency becomes maximum with the period of the LGC 113 being $\Lambda = 3.776$ $\mu$m according to equation (23). When the ratio N/n is $\delta = 1.0023$ and the incident angle is $\Phi = 65°$, the angle u which satisfies equation (24) becomes $\alpha = 77.80°$. Therefore, the angle $\alpha$ formed between the end surface 111a of the substrate 111 and the optical waveguide 112 is 77.80°.

In order for the incident angle to be $\Phi = 65°$ when the angle $\alpha$ is 77.80°, the light beam 117 is applied such that it is refracted by the end surface 111a in the same direction as the direction in which it is diffracted by the LGC 113. Since the angle $\theta 1$ of incidence of the light beam 117 upon the end surface 111a and the angle $\theta 2$ of exit of the light beam from the end surface 111a are related as follows:

$\sin\theta 1/\sin\theta 2 = n/1, \alpha - \Phi = \theta 2,$ the incident angle $\theta 1$ becomes 28.79°. Therefore, if the angle $\alpha$ is selected as 77.80° and the light beam 117 is applied to the end surface 111a at the incident angle $\theta 1 = 28.79°$, the light input efficiency at the LGC 113 remains the same as when $t_o = 25°$ C. for the reasons described above even if the refractive index n of the substrate 111 varies due to a change in the substrate temperature. (At this time, the temperature coefficient of the refractive index is $\Delta n/\Delta t = 3.5 \times 10^{-5}$ deg$^{-1}$ as described above.)

FIG. 18 shows the relationship between the amount $\Delta t$ by which the substrate temperature varies and the light input efficiency, as indicated by the solid-line curve. The light input efficiency is represented by the ratio thereof ($\eta/\eta o$) to the efficiency $\eta o$ at the reference temperature $t_o = 25°$ C., and the amount $\Delta t$ by which the substrate temperature varies is represented by the difference between the actual temperature and the reference temperature $t_o = 25°$ C. It can be seen from FIG. 18 that according to the third method of the present invention the light input efficiency is kept at a constant level even when the substrate temperature varies. The broken-line curve in FIG. 18 also indicates how the light input efficiency varies, when the same conditions described above exist except that $\alpha = \Phi = 65°$ and the light beam 117 is applied perpendicularly to the end surface 111a of the substrate 111. The broken-line curve in FIG. 18 indicates that the light input efficiency $\eta$ is 10% lower at $\Delta t = 5.7°$ C. and 50% lower at $\Delta t = 14.1°$ C. than the light input efficiency at $t_o = 25°$ C.

While the third method has been described as being applied to the introduction of the light beam into the optical waveguide, it is also applicable to the emission of the light beam from the optical waveguide.

With the third method of the present invention, as described above, when the angle between the end surface of the substrate and the optical waveguide is selected so that equation (24) above is satisfied, the light input efficiency can be maintained at a substantially constant level even if the substrate temperature varies when the light beam is introduced into the optical waveguide. Thus, the third method of the invention is effective in keeping the efficiency with which the light is utilized high at all times. The third method is applicable to a device in which a guided wave propagating in an optical waveguide is continuously diffracted and deflected by a surface elastic wave, and then emitted out of the optical waveguide. The deflected light beam which is emitted from the waveguide then scans a recording medium and records an image thereon or reads a recorded image therefrom. In such an application, the intensity of the light beam applied to the recording medium is stabilized, which allows the image to be recorded or read with a high accuracy.

Where the third method is applied to the emission of the light beam from the optical waveguide, the path of the external light which leaves the end surface of the substrate is made to follow a substantially constant direction. Consequently, a complex optical system for correcting variations in the light exit angle at the grating coupler is not required. When the third method of the invention is applied to the recording or reading of images as described above, any positional displacements or fluctuations of the scanning light beam due to light wavelength variations are prevented from occurring.

As a result, images can be recorded or read with increased accuracy.

An optical pickup according to the present invention will be described below.

Figure 19:
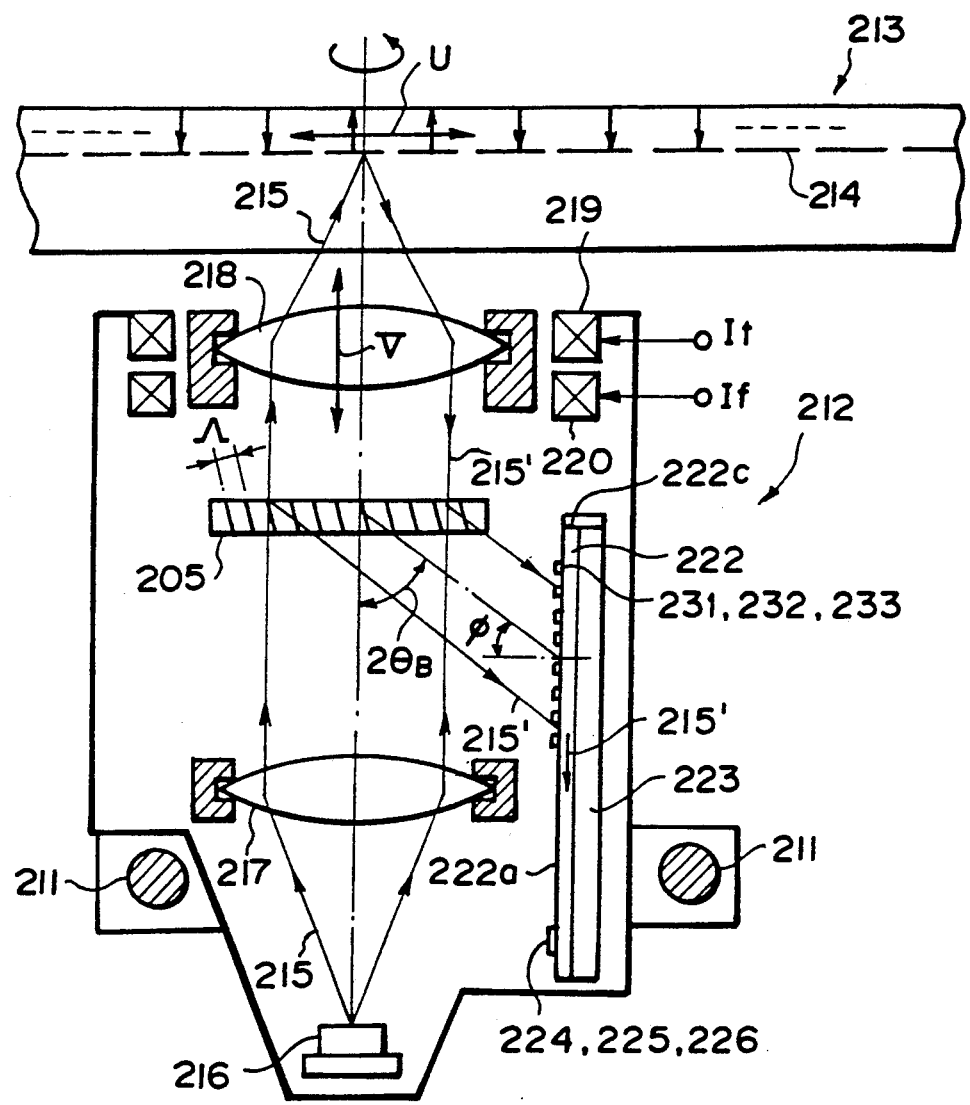
FIG. 19 is a side elevational view of an optical pickup according to a first embodiment of the present invention.
Figure 20:
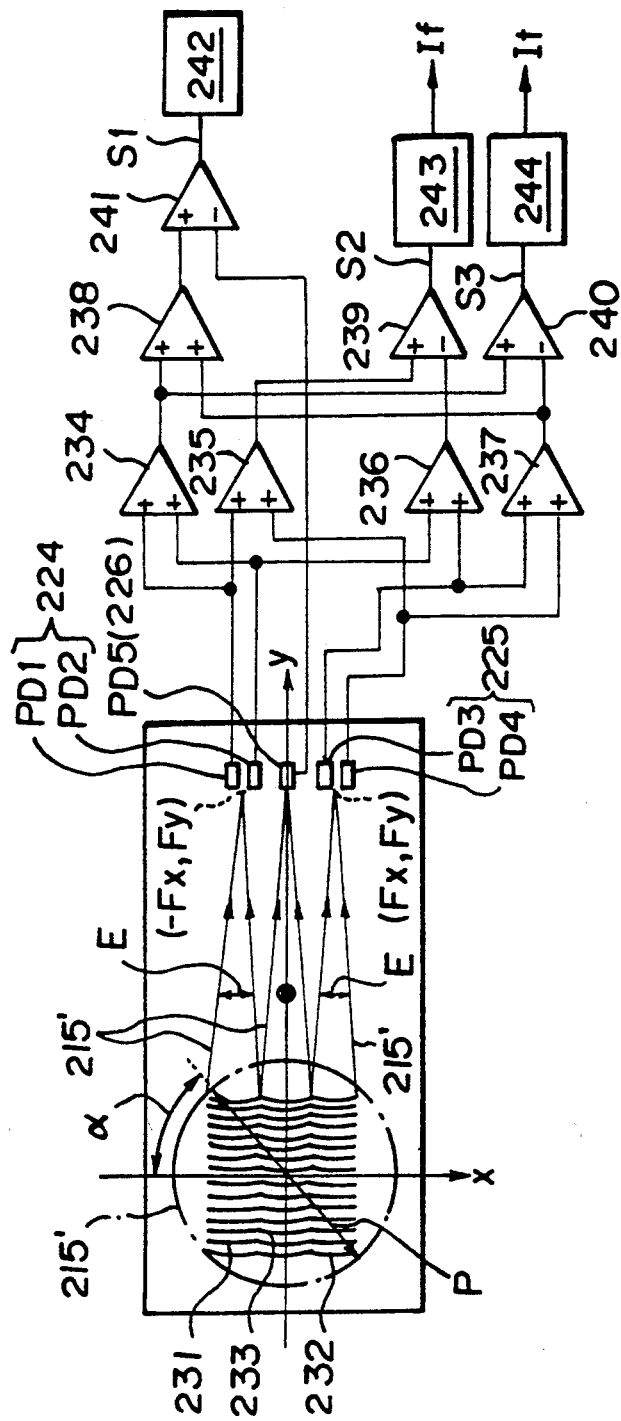
FIG. 20 is a plan view of an optical waveguide of the optical pickup shown in FIG. 19, with an electric circuit thereof being shown in block form.

FIG. 19 shows an optical pickup according to a first embodiment of the present invention, the optical pickup being used in combination with a magnetooptic recording medium, for example. In FIG. 20 a plan view of an optical waveguide of the optical pickup is shown along with a block diagram of an electric circuit of the optical pickup. As shown in FIG. 19, the optical pickup has a block 212 mounted on and movable along a pair of rods 211 extending perpendicularly to the sheet of FIG. 19. So that the optical pickup can follow, or stay in alignment with, a series of signals or a signal track on a magnetooptic disc 213, the block 212 is moved with a precision feed screw and a feed motor (not shown) in a direction (i.e., a radial direction) normal to or substantially normal to the track, which is indicated by the arrow U, to the position from which a light beam is applied to the magnetooptic disc 213.

The block 212 supports thereon a semiconductor laser 216 for emitting a linearly polarized, divergent light beam (laser beam) 215 toward a reflecting surface 214 on the magnetooptic disc 213, a collimator lens 217 for converting the divergent light beam from the semiconductor laser 216 to a parallel beam, and an objective lens 218 for focusing the parallel beam onto the reflecting surface 214. The objective lens 218 is supported such that it can move in the radial direction (normal to the track direction indicated by the arrow U) and in the direction indicated by the arrow V. The objective lens 218 can be moved in these directions with a tracking coil 219 and a focusing coil 220 which are mounted on the block 212.

Between the collimator lens 217 and the objective lens 218, there is disposed a wavelength-fluctuation-correcting linear grating 205 for diffracting a light beam 215' reflected from the magnetooptic disc 213 away from the path of the light beam 215 directed toward the reflecting surface 214. The block 212 also supports an optical waveguide 222 disposed such that its surface 222a receives the reflected light beam 215' diffracted by the wavelength-fluctuation-correcting grating 205. On the surface 222a of the optical waveguide 222 where the reflected light beam 215' is applied, adjacent to each other there are mounted first, second, and third focusing grating couplers (hereinafter referred to as "FGCs") 231, 232, 233, each comprising a curved grating coupler for introducing the reflected light beam 215' into the optical waveguide 222 and focusing the light beam 215' at a position in the optical waveguide 222. The first and second FGCs 231, 232 are disposed one on each side of an axis (i.e., the y-axis in FIG. 20) extending perpendicularly to the radial direction of the disc 213 and passing substantially through the center of the reflected light beam 215'. The first and second FGCs 231, 232 serve to focus the reflected light beam 215' onto positions spaced away from each other across the y-axis. The third FGC 233 is disposed between and along the first and second FGCs 231, 232.

It is assumed that the coordinates of the positions where the light beam is focused by the FGCs 231, 232 are indicated by ($-Fx, Fy$) and ($Fx, Fy$), respectively, with respect to a coordinate system having the y-axis described above and an x-axis normal to the y-axis (FIG. 20) on the optical waveguide 222, the x-axis being parallel to the radial direction of the disc 213 Then, the mth grating pattern of the FGCs 231, 232 is given by the equation:

$$y\sin\Phi + N_{TE}\sqrt{(x \pm Fx)^2 + (y - Fy)^2} = m\lambda + \text{const.}$$

[the double sign becomes "+" for the FGC 231 and "−" for the FGC 232] where $\lambda$ is the wavelength of the reflected light beam 215', $\Phi$ is the angle of incidence of the light beam 215' upon the FGCs 231, 232, and $N_{TE}$ is the effective refractive index of the optical waveguide 222 with respect to light propagating in a TE mode.

If it is assumed that the coordinates of the position where the light beam is focused by the FGC 233 are indicated by (0, Fy), then the mth grating pattern of the FGC 233 is given by the equation:

$$y\sin\Phi + N_{TM}\sqrt{x^2 + (y - Fy)^2} = m\lambda + \text{const.}$$

where $N_{TE}$ is the effective refractive index of the optical waveguide 222 with respect to light propagating in a TM mode.

The periods of the first, second, and third FGCs 231, 232, 233 are selected such that the first and second FGCs 231, 232 excite the TE guided mode, and the third FGC 233 excites the TM guided mode. As shown in FIG. 20, the optical waveguide 222 is arranged such that the x-axis is inclined 45° with respect to the direction (indicated by the arrow P) of linear polarization of the reflected light beam 215'. The direction of linear polarization of the reflected light beam 215' rotates with the direction of magnetization of the magnetooptic disc 213. Therefore, the direction of linear polarization of the light beam 215' reflected from a nonmagnetized region of the disc 213 is used as a reference, and the x-axis and this reference direction form an angle of 45° therebetween.

The optical waveguide 222 may be formed by sputtering #7059 glass on a substrate 223 which is made of Pyrex glass. The FGCs 231, 232, 233 may be formed by depositing a film of Si-N on the optical waveguide 222 by PCVD, forming a resist pattern by direct electron beam exposure, and transferring the resist pattern to the Si-N film by REI.

On the surface 222a of the optical waveguide 222, there are disposed first, second, and third light detectors 224, 225, 226 for detecting the reflected beams 215' which are focused by the respective FGCs 231, 232, 233. The first light detector 224 comprises, for example, two photodiodes PD1, PD2 separated from each other by a gap extending parallel to the y-axis, and the second light detector 225 similarly comprises two photodiodes PD3, PD4 separated from each other by a gap parallel to the y-axis. The third light detector 226 comprises a single photodiode PD5.

As shown in FIG. 20, the output signals from the photodiodes PD1, PD2 are added to each other with a summing amplifier 234, and the output signals from the photodiodes PD3, PD4 are also added to each other with a summing amplifier 237. The output signals from the outer photodiodes PD1, PD4 of the first and second light detectors 224, 225 are added to each other with a summing amplifier 235, and the output signals from the inner photodiodes PD2, PD3 of these light detectors 224, 225 are added to each other with a summing amplifier 236. The output signals from the summing amplifiers 234, 237 are applied to a summing amplifier 238 and a differential amplifier 240, and the output signals from the summing amplifiers 235, 236 are applied to a differential amplifier 239. An output signal from the summing amplifier 238 and an output signal from the photodiode PD5 are applied to a differential amplifier 241. An output signal S1 from the differential amplifier 241, an output signal S2 from the differential amplifier 239, and an output signal S3 from the differential amplifier 240 are applied respectively to a read-out circuit 242, a focusing coil control circuit 243, and a tracking coil control circuit 244.

The optical pickup shown in FIGS. 19 and 20 operates as follows: The light beam (laser beam) 215, which was emitted from the semiconductor laser 216 and converted into the parallel beam, passes through the grating 205 and is focused onto the reflecting surface 214 of the magnetooptic disc 213 by the objective lens 218. The magnetooptic disc 213 is rotated by a rotary actuator (not shown), which moves the track in the direction indicated by the arrow U to the position at which the reflecting surface 214 is irradiated by the light beam 215. As is well know, the track is composed of a series of magnetic poles whose directions represent image or audio signals. (The poles are indicated by vertical arrows above the reflecting surface 214 in FIG. 19.) The direction of linear polarization of the light beam 215' reflected from the magnetooptic disc 213 depends on the direction of magnetization of the irradiated region of the track and is rotated away from the direction of linear polarization of the light beam 215' when it is reflected from a nonmagnetized region. More specifically, the direction of linear polarization of the light beam 215' reflected from a region that is magnetized in a certain direction is rotated clockwise from the polarized direction indicated by the arrow P in FIG. 20, whereas the direction of linear polarization of the light beam 215' reflected from a region that is magnetized in the opposite direction is rotated counterclockwise from the polarized direction indicated by the arrow P.

The reflected light beam 215' passes through the objective lens 218, is diffracted by the wavelength-fluctuation-correcting grating 205, and is introduced into the optical waveguide 222 by the FGCs 231, 232, 233. The diffraction of the reflected light beam 215' by the grating 205 will be described in detail later on. The reflected light beam 215' propagating in the optical waveguide 222 is focused by the FGCs 231, 232, 233 onto two positions disposed one on each side of the y-axis and a position on the y-axis. As described above, the first and second FGCs 231, 232 excite the TE guided mode to cause the light propagating in the optical waveguide 222 to have an electric field vector indicated by the arrow E in FIG. 20, whereas the third FGC 233 excites the TM guided mode to cause the light propagating in the optical waveguide 222 to have an electric field vector normal to the sheet of FIG. 20. Therefore, when the direction of linear polarization of the reflected beam 215' is rotated clockwise from the direction indicated by the arrow P, the intensity of the reflected light beam 215' introduced into the optical waveguide 222 by the third FGC 233 is increased, and the intensity of the reflected light beams 215' introduced into the optical waveguide 222 by the first and second FGCs 231, 232 is reduced. When the direction of linear polarization of the reflected beam 215' is rotated counterclockwise from the direction indicated by the arrow P, the intensity of the reflected light beam 215' introduced into the optical waveguide 222 by the third FGC 233 is reduced, and the intensity of the reflected light beam 215' introduced into the optical waveguide 222 by the first and second FGCs 231, 232 is increased.

More specifically, it is assumed that the direction of linear polarization of the reflected light beam 215' and the x-axis in FIG. 20 form an angle $\alpha$ therebetween, and the opening area of the FGC 231 or 232 for receiving the reflected light beam 215' is equal to the opening area of the FGC 233 for receiving the reflected light beam 215'. The intensity I1 of the light introduced into the optical waveguide 222 by the FGC 231 or 232 and the intensity I2 of the light introduced into the optical waveguide 222 by the FGC 233 vary in proportion to $\cos^2\alpha$ and $\sin^2\alpha$, respectively. Therefore, when the angle $\alpha$ is smaller than 45°, the intensity I1 of the light introduced into the optical waveguide 222 by the FGC 231 or 232 is larger than the intensity I2 of the light introduced into the optical waveguide 222 by the FGC 233. When the angle $\alpha$ is larger than 45°, the intensity I1 is smaller than the intensity I2. Accordingly, with the gain of the summing amplifier 238 being suitably selected, when the direction of linear polarization of the reflected light beam 215' is rotated clockwise from the direction indicated by the arrow P in FIG. 20, the output signal of the differential amplifier 241 can be rendered negative, and when the direction of linear polarization of the reflected light beam 215' is rotated counterclockwise, the output signal of the differential amplifier 241 can be rendered positive. Making the output signal S1 from the differential amplifier 241 respond in this way allows the direction of polarization of the magnetooptic disc 213, i.e., the recorded information, to be read.

Signals produced by the first, second, and third light detectors 224, 225, 226 tend to contain noise due to fluctuations in the intensity of the light generated by the semiconductor laser 216 and noise resulting from variations in the reflectivity and crystalline grain of the magnetic recording film of the magnetooptic disc 213. The noise components contained in the output signals from the first and second light detectors 224, 225 and the noise components contained in the output signal from the third light detector 226 are in phase with each other. Consequently, these noise components can be canceled out by each other because the signals are differentially detected as described above, so that the read-out signal S1 has a high S/N ratio.

If the angle $\alpha$ varies a constant interval, the light intensities I1 and I2 vary a maximum amount, and hence the differential output signal S1 becomes maximum when the angle $\alpha$ varies across $\alpha=45°$. Even if the angle of rotation of the plane of linear polarization (Kerr angle of rotation) of the reflected light beam 215', which results from differing directions of magnetization in the magnetooptic disc 213, is very small (generally in the range of from 0.3° to 0.5°), the rotation of the plane of polarization can be detected highly accurately.

In the embodiment shown in FIGS. 19 and 20, the difference between the sum of the output signals of the first and second light detectors 224, 225 and the output signal from the third light detector 226 is detected. It is also possible to detect the difference between one of the output signals from the light detectors 224, 225 and the output signal from the light detector 226 and thereby read the recorded information. However, since the output signal from the light detector 224 or 225 can vary due to tracking errors, the signal difference should preferably be detected as with the embodiment for preventing erroneous signal detection.

As described above, the block 212 is fed in a direction normal to or substantially normal to the direction indicated by the arrow U by the feed motor, which thereby changes the position (in the radial direction of the disc 213) at which the light beam 215 is applied to the magnetooptic disc 213 and allows recorded signals to be read continuously. At this time, the light beam 215 must be applied properly to the center of the series of signals or the signal track. A tracking control mode which ensures that the light beam 215 is properly applied to the signal track will be described below. When the center of the reflected beam 215' is positioned between the FGCs 231, 232, the intensity of the light detected by the first light detector 224 (comprising the photodiodes PD1, PD2) and the intensity of the light detected by the second light detector (comprising the photodiodes PD2, PD4) are equal to each other. At this time, therefore, the output signal S3 from the differential amplifier 240 is 0 (zero). If the light beam 215 is applied at an improper position, thus displacing the intensity distribution of the reflected light beam 215' upwardly in FIG. 20, the intensity of the light detected by the first light detector 224 becomes larger than the intensity of the light detected by the second light detector 225. Therefore, the output signal S3 from the differential amplifier 225 goes positive. Conversely, if the intensity distribution of the reflected light beam 215' is displaced downwardly in FIG. 20, the output signal S3 from the differential amplifier 240 goes negative. Accordingly, the output signal from the differential amplifier 240 is representative of the direction of the tracking error (indicated by the arrow x in FIG. 20). The output signal S3 from the differential amplifier 240 is supplied as a tracking error signal to the tracking coil control circuit 244. The above method of detecting a tracking error by processing the output signals from the photodiodes PD1 through PD4 is known as the push-pull method. In response to the tracking error signal S3, the tracking coil control circuit 244 supplies a current It depending on the direction of the tracking error indicated by the signal S3 to the tracking coil 219, which thereby causes the objective lens 218 to move in a direction which eliminates the tracking error. The light beam 215 is therefore applied to the center of the signal track at all times.

A focusing control mode for properly focusing the light beam 215 onto the reflecting surface 214 of the magnetooptic disc 213 will be described below. When the light beam 215 is focused correctly on the reflecting surface 214 of the magnetooptic disc 213, the reflected light beam 215' converged by the FGC 231 is focused on a position intermediate between the photodiodes PD1, PD2. At this time, the reflected beam 215' converged by the FGC 232 is also focused on a position intermediate between the photodiodes PD3, PD4. Therefore, the output signal from the summing amplifier 235 and the output signal from the summing amplifier 236 are equalized, and the output signal S2 from the differential amplifier 239 becomes 0 (zero). If the light beam 215 is overfocused, i.e., focused in front of the reflecting surface 214, the reflected light beam 215' applied to the FGCs 231, 232 is a convergent beam, and it is applied to inner positions in the light detectors 224, 225 (i.e., positions displaced toward the photodiodes PD2, PD3, respectively). In this case, the output signal from the summing amplifier 235 becomes lower than the output signal from the summing amplifier 236, and the output signal S2 from the differential amplifier 239 goes negative. Conversely, if the light beam 215 is underfocused, i.e., focused beyond the reflecting surface 214, the reflected light beam 215' applied to the FGCs 231, 232 is a divergent beam, and it is applied to outer positions in the light detectors 224, 225 (i.e., positions displaced toward the photodiodes PD1, PD4, respectively). Now the output signal from the summing amplifier 235 becomes larger than the output signal from the summing amplifier 236, and the output signal S2 from the differential amplifier 239 goes positive. Consequently, the output signal S2 from the differential amplifier 239 is indicative of the direction of the focusing error. The output signal S2 is then fed as a focusing error signal to the focusing coil control circuit 243. The above method of detecting a focusing error by processing the output signals from the photodiodes PD1 through PD4 is known as the Foucault method and employs a Foucault prism. In response to the focusing error signal S2, the focusing coil control circuit 243 supplies a current If depending on the direction of the focusing error indicated by the signal S2 to the focusing coil 220, which thereby causes the objective lens 218 to move in a direction which eliminates the focusing error. The light beam 215 is now properly focused onto the reflecting surface 214 of the magnetooptic disc 213.

How the wavelength-fluctuation-correcting grating 205 operates will be described below. In the illustrated embodiment, the light beam 215, i.e., the reflected light beam 215', has a wavelength (a central reference wavelength) $\lambda = 830$ nm, the FGCs 231, 232, 233 have a period $\Lambda_{GC} = 830$ nm, the optical waveguide 222 has an effective refractive index $N = 1.5$, and the angle of incidence of the reflected light beam 215' upon the FGCs 231, 232, 233 is $\Phi = 30°$. The Bragg angle $\theta_B$ at the wavelength-fluctuation-correcting grating 205 is 30°, which satisfies equation (18) referred to above. Therefore, assuming that $q = 1$ and $nc = 1$, $$\theta_B = \tan^{-1}\left(\frac{830 \times 1}{830 \times 2 \times 1 \times \cos 30°}\right) = 30°$$

From equation (13) above, the period $\Lambda_B$ of the grating 205 is given as:

$$\Lambda_B = \frac{830}{2 \times \sin 30°} = 830 \text{ nm}$$

thus satisfying the Bragg condition.

Strictly, it is necessary to select the periods of the FGCs 231, 232 and the period of the FGC 233 so that they differ from each other in view of the different effective refractive indexes with respect to light propagating in the TE and TM modes. However, since the difference between those periods is 0.3% and hence sufficiently small, it is possible to correct fluctuations in the light wavelength even if the FGCs 231, 232, 233 have the same period.

As described above, the direction in which the reflected light beam 215' is diffracted by the wavelength-fluctuation-correcting grating 205 is opposite to the direction in which the light beam 215' is diffracted by the LGCs 231, 232, 233. More specifically, since the reflected light beam 215' is diffracted rightwardly of its direction of travel by the FGCs 231, 232, 233, as shown in FIG. 19, the reflected light beam 215' is diffracted leftwardly of its direction of travel by the wavelength-fluctuation-correcting grating 205.

Since the reflected light beam 215' is first diffracted by the wavelength-fluctuation-correcting grating 205 and then introduced into the optical waveguide 222, the incident angle $\Phi$ varies as the wavelength of the reflected light beam 215' varies for the reasons described above, so that the light input efficiency with which the reflected light beam 215' is applied to the FGCs 231, 232, 233 is kept at a substantially constant level. With the arrangement of the illustrated embodiment, any variations in the light input efficiency $\eta$ are kept below 1% even if the wavelength $\lambda$ of the reflected light beam 215' fluctuates ±100 nm from the central wavelength of 830 nm.

Figure 21:
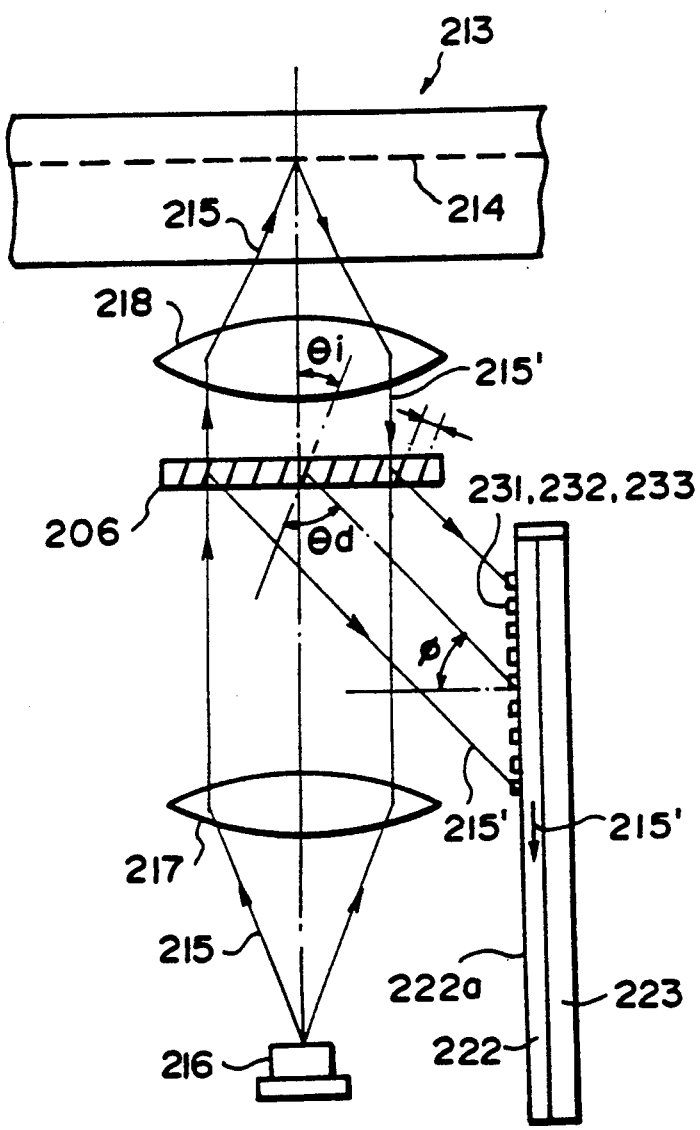
FIG. 21 is a side elevational view of an optical pickup according to a second embodiment of the present invention.

An optical pickup according to a second embodiment of the present invention will be described below with reference to FIG. 21. FIG. 21 only shows principal components of the optical pickup, and those parts which are omitted from the illustration are basically the same as those shown in FIG. 19.

In FIG. 19, the wavelength (central wavelength) of the reflected light beam 215' is $\lambda = 830$ nm, the period of the FGCs 231, 232, 233 is $\Lambda_{GC} = 1047$ nm, the effective refractive index of the optical waveguide 222 is $N = 1.5$, and the angle of incidence of the reflected light beam 215' upon the FGCs 231, 232, 233 is $\Phi = 45°$. In order to satisfy equation (23), the period of a wavelength-fluctuation-correcting grating 206 is $\Lambda = 1047$ nm and the angle of diffraction is $\theta d = 45°$. Therefore, with $m = 1$, $q = 1$, and $nc = 1$, we get $$1047 = \frac{1}{1} \times \frac{\cos 45°}{\cos 45°} \times 1047$$

The wavelength-fluctuation-correcting gratings 205, 206 positioned according to the above embodiments may serve as a beam splitter for separating the reflected light beam 215' from the path of the light beam 215. However, a separate beam splitter for separating the reflected light beam 215' may be employed, and the grating 205 or 206 may be disposed in the path of the reflected light beam after it has been separated by the beam splitter.

Under the conditions described above, any fluctuations in the wavelength of the reflected light beam 215' are corrected, which suppresses variations in the light input efficiency at the FGCs 231, 232, 233.

The present invention is also applicable to an optical pickup for use with an optical recording medium as disclosed in Japanese Unexamined Patent Publication No. 63(1988)-61430.

In the optical pickups of the present invention, the wavelength-fluctuation-correcting grating may comprise a general grating having slits or grooves, a blazed grating, a refractive index modulation grating, or a reflection grating. If a thick grating (with Q being 10 or higher) is employed, then the efficiency of diffraction will be higher.

According to the optical pickups of the present invention, as described above, when a reflected light beam is diffracted with the wavelength-fluctuation-correcting grating, the light input efficiency can be maintained at a substantially constant level even if the wavelength of the reflected light beam varies when the reflected light beam is introduced into the optical waveguide. Therefore, the optical pickups of the invention are effective in keeping the efficiency of with which the light is utilized high at all times. Since the intensity of the light detected by the light detectors is prevented from varying due to wavelength fluctuations irrespective of the information which has been recorded and irrespective of tracking and focusing conditions, the recorded information can be read and tracking and focusing errors can be detected accurately.

Even when the semiconductor laser is energized by a drive current with a high-frequency current added thereto to reduce noise caused by the reentering light, the light input efficiency is not greatly reduced, and signals can be detected stably and with a high S/N ratio.

Although certain preferred embodiments have been shown and described, it should be understood that many changes and modifications may be made therein without departing from the scope of the appended claims.

I claim:

1. A method of coupling external light to an optical waveguide or a guided wave from an optical waveguide through a grating coupler disposed on a surface of the optical waveguide, comprising the step of:

diffracting the external light with a wavelength-fluctuation-correcting grating in a direction opposite to the direction of diffraction by the grating coupler on the surface of the optical waveguide, while satisfying the Bragg condition defining the Bragg angle $\theta_B$ as:

$$\theta_B = \tan^{-1}\left(\frac{\lambda}{\Lambda_{GC}} \frac{q}{2nc\cos\Phi}\right)$$

where $\lambda$ is the wavelength of the light, $\Lambda_{GC}$ is the period of the grating coupler on the surface of the optical waveguide, $\Phi$ is the angle of incidence of the external light upon or the angle of exit of the external light from the grating coupler on the surface of the optical waveguide, nc is the refractive index of a medium on which the wavelength-fluctuation-correcting grating is disposed, and q is the coupling order number ($=\pm 1, \pm 2, \pm 3, \ldots$) of the grating coupler on the surface of the optical waveguide.

2. A method of coupling external light to an optical waveguide or a guided wave from an optical waveguide through a grating coupler disposed on a surface of the optical waveguide, comprising the step of:

diffracting the external light with a wavelength-fluctuation-correcting grating in a direction opposite to the direction of diffraction by the grating coupler on the surface of the optical waveguide, while satisfying the following equation:

$$\Lambda = \frac{m}{q} \frac{\cos\Phi}{\cos\theta d} \Lambda_{GC}$$

when $\Lambda$ and $\theta d$ are the period of and the angle of diffraction by the wavelength-fluctuation-correcting grating, m and q are the coupling order numbers ($=\pm 1, \pm 2, \pm 3, \ldots$) of the wavelength-fluctuation-correcting grating and the grating coupler on the surface of the optical waveguide, respectively, $\Lambda_{GC}$ is the period of the grating coupler on the surface of the optical waveguide, and $\Phi$ is the angle of incidence of the external light upon or the angle of exit of the external light from the grating coupler on the surface of the optical waveguide.

3. A method of coupling external light to an optical waveguide or a guided wave from an optical waveguide through a grating coupler disposed on the surface of the optical waveguide, comprising the step of:

passing the external light through an end surface of the substrate of the optical waveguide so that the light is refracted in the same direction as the direction of diffraction by the grating coupler on the surface of the optical waveguide, said end surface being inclined with respect to the optical waveguide at an angle $\alpha$ defined by:

$$\alpha = \tan^{-1}\left(\frac{\delta - \sin\Phi}{\cos\Phi}\right) + \Phi$$

where $\delta$ is the ratio of the effective refractive index N of the optical waveguide to the refractive index n of the substrate at a desired temperature $t_o$, and $\Phi$ is the angle of incidence of the external light upon or the angle of exit of the external light from the grating coupler at the temperature $t_o$.

4. An optical pickup for reading recorded information from an optical or magnetooptic recording medium, comprising:

i) means for applying a light beam to the recording medium;

ii) an optical waveguide;

iii) a light-introducing grating coupler mounted on said optical waveguide for diffracting a light beam reflected from the recording medium and introducing the diffracted light beam into said optical waveguide;

iv) light detecting means for detecting the light beam, which is converged in said optical waveguide so that the recorded information can be read and tracking and focusing errors can be detected therewith; and v) a wavelength-fluctuation-correcting grating for diffracting the reflected light beam, before it is applied to said light-introducing grating coupler, in a direction opposite to the direction of diffraction by the light-introducing grating coupler, said wavelength-fluctuation-correcting grating being arranged such that it diffracts the reflected light beam while satisfying the Bragg condition defining the Bragg angle $\theta B$ as:

$$\theta_B = \tan^{-1}\left(\frac{\lambda}{\Lambda_{GC}} \frac{q}{2nc\cos\Phi}\right)$$

where $\lambda$ is the wavelength of the light, $\Lambda_{GC}$ is the period of the light-introducing grating coupler, $\Phi$ is the angle of incidence of the external light upon the light-introducing grating coupler, nc is the refractive index of a medium on which the wavelength-fluctuation-correcting grating is disposed, and q is the coupling order number ($=\pm 1, \pm 2, \pm 3, \ldots$) of the light-introducing grating coupler.

5. An optical pickup for reading recorded information from an optical or magnetooptic recording medium, comprising:

i) means for applying a light beam to the recording medium;

ii) an optical waveguide;
iii) a light-introducing grating coupler mounted on said optical waveguide for diffracting a light beam reflected from the recording medium and introducing the diffracted light beam into said optical waveguide;
iv) a plurality of light detectors for detecting the light beam, which is converged in said optical waveguide so that the recorded information can be read and tracking and focusing errors can be detected therewith; and
v) a wavelength-fluctuation-correcting grating for diffracting the reflected light beam, before it is applied to said light-introducing grating coupler, in a direction opposite to the direction of diffraction by the light-introducing grating coupler, said wavelength-fluctuation-correcting grating being arranged such that it diffracts the reflected light beam while satisfying the following equation:

$$\Lambda = \frac{m}{q} \frac{\cos\Phi}{\cos\theta d} \Lambda_{GC}$$

where $\Lambda$ and $\theta d$ are the period of and the angle of diffraction by the wavelength-fluctuation-correcting grating, m and q are the coupling order numbers ($= \pm 1, \pm 2, \pm 3, \ldots$) of the wavelength-fluctuation-correcting grating and the light-introducing grating coupler, respectively, $\Lambda_{GC}$ is the period of the light-introducing grating coupler, and $\Phi$ is the angle of incidence of the reflected light beam upon the light-introducing grating coupler.

* * * * *